US010235618B2

(12) United States Patent
Toedtli et al.

(10) Patent No.: US 10,235,618 B2
(45) Date of Patent: Mar. 19, 2019

(54) AUTHENTICATION FEATURE IN A BARCODE

(71) Applicant: Hicof Inc., Wollerau (CH)

(72) Inventors: Sascha Toedtli, Bäch (CH); Sergej Toedtli, Bäch (CH)

(73) Assignee: HICOF INC., Wollerau (CH)

( * ) Notice: Subject to any disclaimer, the term of this patent is extended or adjusted under 35 U.S.C. 154(b) by 0 days.

(21) Appl. No.: 15/834,130

(22) Filed: Dec. 7, 2017

(65) Prior Publication Data

US 2018/0107915 A1 Apr. 19, 2018

Related U.S. Application Data

(63) Continuation of application No. PCT/EP2016/063690, filed on Jun. 15, 2016.
(Continued)

(51) Int. Cl.
*G06K 7/10* (2006.01)
*G06K 19/14* (2006.01)
*G06K 19/06* (2006.01)

(52) U.S. Cl.
CPC ....... *G06K 19/14* (2013.01); *G06K 19/06028* (2013.01); *G06K 19/06037* (2013.01); *G06K 19/06056* (2013.01)

(58) Field of Classification Search
CPC ... G06K 7/14; G06K 7/10851; G06K 7/10594
(Continued)

(56) References Cited

U.S. PATENT DOCUMENTS 6,032,861 A 3/2000 Lemelson et al.
7,229,025 B2 6/2007 Sussmeier et al.
(Continued)

FOREIGN PATENT DOCUMENTS

DE 102011051816 A1 1/2013
EP 1690697 A1 8/2006
(Continued)

OTHER PUBLICATIONS

International Preliminary Report on Patentability; PCT/EP2016/063690; dated Dec. 19, 2017 (9 Pages).
(Continued)

*Primary Examiner* — Ahshik Kim
(74) *Attorney, Agent, or Firm* — Bose McKinney & Evans LLP

(57) ABSTRACT

A method for serializing products using a barcode and checking authenticity of barcodes. A printing modification introduces an authentication feature into the barcode. Print batch data comprising a batch of serial codes and an individual security rationale for modifying the barcode is provided. A modified barcode is printed using a single serial code out of the range of sequential serial numbers and the assigned individual security rationale to provide the barcode with an authentication feature. To check authenticity of a barcode, an image of the modified barcode is processed and submitted to a central database. Content of the modified barcode is read to decode the serial number. The serial number is used to identify a print batch and individual security rationale. If reconstructed properties of the modified barcode and corresponding original properties of the modified barcode stored in the central database are identical, the barcode is considered an original barcode.

20 Claims, 7 Drawing Sheets

Related U.S. Application Data

(60) Provisional application No. 62/181,423, filed on Jun. 18, 2015, provisional application No. 62/201,848, filed on Aug. 6, 2015.

(58) Field of Classification Search
USPC .................................................. 235/462.01
See application file for complete search history.

(56) References Cited

U.S. PATENT DOCUMENTS

| | | |
|---|---|---|
| 7,533,062 B2 | 5/2009 | Sanchez et al. |
| 7,630,511 B2 | 12/2009 | Zhao et al. |
| 8,893,974 B2 | 11/2014 | Pawlik et al. |
| 2004/0013285 A1 | 1/2004 | Jordan et al. |
| 2004/0211844 A1* | 10/2004 | Marshall ................. G06K 1/121 235/494 |
| 2006/0147082 A1 | 7/2006 | Jordan et al. |
| 2008/0164338 A1 | 7/2008 | Burns |
| 2008/0304110 A1* | 12/2008 | Simske ................... B41M 3/14 358/3.28 |
| 2010/0012736 A1 | 1/2010 | Wilds et al. |
| 2010/0080471 A1 | 4/2010 | Haas et al. |
| 2013/0015236 A1 | 1/2013 | Porter et al. |
| 2013/0228619 A1 | 9/2013 | Soborski |
| 2014/0131458 A1 | 5/2014 | Picard et al. |
| 2015/0083801 A1 | 3/2015 | Soborski |
| 2015/0169928 A1* | 6/2015 | Soborski ................ G06K 7/146 235/375 |

FOREIGN PATENT DOCUMENTS

| | | |
|---|---|---|
| EP | 1433305 B1 | 11/2008 |
| EP | 1719070 31 | 4/2009 |
| EP | 1319219 B1 | 11/2010 |
| EP | 1780636 B1 | 4/2013 |
| EP | 1514227 31 | 6/2013 |
| EP | 2339547 B1 | 11/2014 |
| WO | WO 2009/097947 A1 | 8/2009 |
| WO | WO 2013/130946 A1 | 9/2013 |
| WO | WO 2015/067725 A1 | 5/2015 |
| WO | WO 2015/117915 A1 | 8/2015 |
| WO | WO 2016/202827 A1 | 12/2016 |

OTHER PUBLICATIONS

International Search Report and Written Opinion; PCT/EP2016/063690; dated Oct. 18, 2016 (11 Pages).

\* cited by examiner

AUTHENTICATION FEATURE IN A BARCODE

CROSS REFERENCE TO RELATED APPLICATIONS

This is a continuation of PCT/EP2016/063690 filed on Jun. 15, 2016 entitled AUTHENTICATION FEATURE IN A BARCODE and which claims priority of U.S. patent application Ser. No. 62/181,423 filed on Jun. 18, 2015 entitled HIDDEN AUTHENTICATION FEATURE IN A BAR CODE and U.S. patent application Ser. No. 62/201,848 filed on Aug. 6, 2015 entitled HIDDEN AUTHENTICATION FEATURE IN A BAR CODE, the disclosures of all three of which are hereby incorporated herein by reference.

BACKGROUND

1. Technical Field

The present disclosure relates to a method for serializing products by using a barcode and to a related method for checking the authenticity of the barcode used in serializing products.

2. Description of the Related Art

Illegal activities in connection with branded products, also denoted as "product piracy", cover a multitude of frauds. To fight against this racketeering, product serialization is a technology usually deployed, by which a sold item carries an individual number which allows product tracking. For serialization purposes, a barcode, in particular a standard barcode, such as a linear code type, a Data Matrix barcode, or a QR, is printed on a product packaging. This measure allows a convenient reading of the barcode which is possible with standard readers available on the market. However, the price for this simplicity is an opportunity for an easy reprint of the barcode by product counterfeiters. Therefore, it is nearly impossible to prove an originality of a product through scanning the barcode. In other words, serialization is effective to fight against criminal activities in the supply chain, such as occurring in gray markets, however, it has turned out not to be effective enough against counterfeiting. To enhance the security of a barcode, mechanisms that allow differentiating between an original barcode and a copied barcode still have to be developed.

In the field of authentication and copy detection of printed documents, including but not limited to barcodes, a large number of methods have been proposed so far. These methods can generally be grouped into a first group adapted to alter the original print in a fashion that may prevent reproduction, a second group adapted to detect individual product properties after printing, a third group that rely on various types of additives, and a fourth group using an encryption of serial numbers.

Herein, the first group of methods proposes overlaying special copy detection patterns over a template, such as described in U.S. Pat. No. 8,893,974 B2, EP 1780636 B1, EP 2339547 B1, U.S. Pat. No. 7,229,025 B2, US 2010/0080471 A1, EP 1514227 B1, EP 1319219 B1; EP 1433305 B1, U.S. Pat. No. 7,630,511 B2, or WO 2015/067725 A1. These methods usually rely on a loss of information during a reproduction of a print. Therefore, these methods, which are also denoted by the term "steganography", make use of detailed microstructures that are overlaid with primary information, such as the kind of print or the barcode. However, problems arise in practice since the copy detection pattern may either be difficult to apply as a result of its size which requires to be very small otherwise it may be easily copied, as, e.g., shown in EP 1433305 B1, or the pattern may degrade the quality of the original print by manipulating a contrast, such that the barcode may receive insufficient grades if checked, e.g., according to ISO/IEC 15414 or 16022. In order to be effective, the protection pattern has typically to be printed with high accuracy by using offset technology with a resolution lower than 50 µm.

The second group of methods, as, e.g., disclosed in U.S. Pat. No. 7,533,062 B2, WO 2009/097947 A1 or WO 2013/130946 A1, is adapted to analyze each print after its generation in order to detect individual properties, such as ink-flows, geometric defects, or contrast alterations, which may be stored in a separate location. Based on this information, the original is generally distinguishable from a reproduction. However, for this purpose these methods usually require additional equipment, e.g. a camera, in order to analyze the printed barcode after its generation.

The third group of methods, as, e.g. disclosed in DE 102011051816 A1 or EP 1690697 A1, employs special inks which are adapted to allow differentiating the original from a reproduction. However, the scope of these methods is limited in consequence of an application of special machinery adapted to apply these kinds of inks or to superimpose structures comprising ink dots as well as to devices adapted to analyze whether the print is the original or a reproduction.

The forth group of methods proposes an encryption of serial numbers in order to increase security. EP 1719070 B1 discloses a method for generating and distributing random codes for serialization. The basic idea is using random serial numbers which are encrypted and, thus, allow preventing a reverse engineering of the random number generation rationale. Nevertheless, it may still easily be possible to compromise the system by copying the encrypted number or string of letters as printed on the product packaging. Therefore, this method does not provide sufficient protection against counterfeiting.

Further, US 2008/0164338 A1 discloses a solution for a protection of documents against altering, wherein a regular grid of dots is printed in an annular area. Based on parameters which are retrieved from attributes in the document and combined with pseudo random numbers the dots are individually displaced. Identifying unauthorized alterations of text elements is performed by checking their positions against the grid. However, no barcodes are used herein.

Further, US 2013/015236 discloses systems and methods for providing document certification and authentication using 2D barcodes.

Further, US 2013/228619 A1 discloses utilizing natural variations in marked features on an item as a way of establishing an identifier specific to that item, storing the identifier separately from the item, and subsequently accessing the identifier to validate the identity of the item.

Further, US 2015/083801 A1 discloses a system for verifying the authenticity of a printed mark which includes an image acquisition device that acquires an image of a printed mark. In one implementation, the printed mark includes coded information associated with a verified original item. The system may also include one or more processors that carry out actions such as receiving the image from the image acquisition device; analyzing the image to identify imperfections in the printed mark, retrieving a genuine mark signature from a database of genuine mark signatures, comparing the identified imperfections with the genuine mark signature, and determining whether the unverified item is authentic based on the comparison.

Further, US 2015/169928 A1 discloses a method of verifying an identity of a printed item which includes capturing an image of the unverified printed item, wherein the unverified printed item includes artifacts and at least some of the artifacts were not controllably producible in producing the unverified printed item; extracting information associated with the artifacts of the unverified printed item; ranking the information associated with the artifacts of the unverified printed item; retrieving stored ranked information associated with artifacts of an original printed item from a storage device; and in each of a first and second range of magnitudes, comparing the ranked information associated with the artifacts of the unverified printed item with the ranked information associated with the artifacts of the original printed item.

WO 2015/117915 discloses a method for providing and identifying specific properties in a printed barcode. For this purpose, both a printer and a camera are required for recording the specific properties during their production. However, for some applications, especially for low-cost products, using a camera for this purpose is not acceptable from an economic point of view. Therefore, it would be desirable to provide such a method which can be used without the application of an additional camera.

SUMMARY

It is desirable to provide a method for serializing products by using a barcode and a related method for checking the authenticity of the barcode used in serializing products, which at least partially overcome the problems and shortcomings of such methods and devices as known from the state of the art.

The present disclosure allows serializing products by using a barcode which may be effective not only in fighting against criminal activities within the supply chain but also against counterfeiting by enhancing the security of the barcode by allowing a differentiation between an original barcode and a copied barcode.

Further, the present disclosure provides a method for serializing products by using a barcode by which specific properties of the barcode which may act as an authentication feature are introduced into the printed barcode, whereby a use of a camera may neither be required for printing the authentication feature in the serialized barcode nor for providing a reference for a later checking of the authenticity of the barcode.

Disclosed is a method for serializing products by using a barcode and by a related method for checking the authenticity of the barcode used in serializing products. Preferred embodiments, which might be realized in an isolated fashion or in any arbitrary combination of features described herein are disclosed.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used herein, the terms "preferably", "more preferably", "particularly", "more particularly" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the feasibility of combining the features introduced in such way with other optional or non-optional features of the invention.

Since the present disclosure refers to a number of different aspects which are, however, closely related to each other, an initial overview over the various aspects of the present disclosure as well as their mutual relationship will be given.

First, a method for serializing products by using a barcode is applied in order to generate a modified barcode, which is, subsequently, printed onto the product, whereby the authentication feature is introduced into the barcode applied for serializing the product. Hereby, the method for serializing products by using a barcode comprises at least steps i) to iii).

Second, a related method for checking the authenticity of barcode used in serializing products is applied in order to determine the authenticity of the product under investigation. For this purpose, an image is taken of the modified barcode comprising the authentication feature introduced by applying the method above, from which the serial number of the product and, subsequently, the authentication feature are acquired. By comparing with database entries, the authenticity of the barcode may, thus, be confirmed or disproved. Hereby, the method for checking the authenticity of the barcode used in serializing products comprises at least steps a) to e) and, optionally, step f).

Since any of the methods according to the present disclosure may at least partially be performed using a computer-related implementation, a computer program including computer-executable instructions as well as a data carrier having a data structure stored thereon comprise further aspects of the present disclosure.

In a first aspect, the present disclosure relates to a method for serializing products by using a barcode, wherein an authentication feature is introduced into the barcode by using a printing modification. As already described above, the present method comprises the following steps step i) to iii). Herein, steps i) to iii) are preferably performed in the given order. Further, it may be feasible to perform two or more of the steps simultaneously or in an overlapping fashion. Further, it may also be feasible to perform one, two or more of the steps repeatedly, not depending on the fact whether other steps may be equally repeated. Further, additional steps may be comprised which are not mentioned in the following.

Accordingly, the method for serializing products by using a barcode comprises the following steps:

i) providing print batch data by a central database, wherein the print batch data comprise a batch of serial codes and at least one individual security rationale for modifying the barcode, whereby the security rationale is assigned to the barcode and a range of sequential serial numbers is defined;

ii) transmitting the print batch data to a printing device, wherein the printing device is designed for printing variable data;

iii) printing a modified barcode by using a single serial code out of the range of the sequential serial numbers and the assigned individual security rationale as provided by the print batch data, whereby an authentication feature is introduced into the barcode.

According to the present disclosure, the term "product" refers to an article to which a barcode, as defined further below, is assigned to. For the purposes of the present disclosure, it is of no particular relevance whether the product itself may be of any value or whether an object, such as a document or a packaging, may refer to or comprise the product which may be of some value, either in a commercial view, a personal view, or any other view. In a first regard, the barcode may, thus, be placed directly on the surface of the product. However, in a number of cases the barcode may, preferably, not be printed on the product itself but on a packaging of any kind which comprises the product. First, the product itself may be of a consistence, such as a gel, a liquid, a gas, or of any other form which may not exhibit a steady solid form, that a particular kind of packaging may be required for storing, transporting, trading, and any other action referring to the product. Second, the surface of the product may not allow the consistent placing of the barcode, e.g. in a case where the surface may be too rough or too impermanent for consistently carrying the barcode. Third, the product may be furnished with any kind of packaging, for example, for any commercial or trading reason, such as for improving the storability, the durability, the stability, or the keeping properties of the product, for equipping the product with a packaging which comprises a specific style or design, particularly for transport or storage reasons, or for improving the optical appearance of the product such as for esthetic or trading reasons. Fourth, there may also be legal or statutory reasons which may require the product to be furnished with a packaging, such as for medical drugs. Fifth, the product may be comprised in at least in one kind of packaging, wherein the packaging may be comprised itself in at least one additional packaging, which is usually referred to as an "outer packaging".

Thus, the product may refer to the article itself, to a label, a document, or any other object which may accompany the article, or to at least the one packaging which may comprise the article. Consequently, the product may not only be selected from the article itself but also from an accompanying object or from any other object which may be employed as the primary packaging for the object, such as a bottle, a syringe, a vial, an ampoule, a carpule, a blister, and/or a secondary packaging such as a cardboard box, a folding box, a hangtag, or any other outer packaging such as a plurality of folding boxes wrapped with plastic foil, called a bundle or a shipping carton, or a container. Within this regard, it is of no relevance whether the packing completely or only partially encloses the object.

As further used herein, the term "barcode" refers to a machine-readable representation of data which are assigned to the product by printing the barcode on one or more of the article, the accompanying object, the primary packaging, and the secondary packaging. In particular, the readability of the data by machine distinguishes the barcode from any other representation of data which relate to the product, such as printing the data in human readable form. However, although the barcode may be readable both by machine and by human beings, it may still be considered as a barcode according to the present invention as long as it can be read by a machine. A primary purpose of the barcode is to encode data which are assigned to the product in a manner that at least one barcode content of the product is encoded within the barcode, wherein the term "barcode content" refers to the representation of the data within the barcode. Knowing a specific barcode content may, thus, allow identifying the specific product related to the specific barcode content. On the other hand, knowing a specific barcode may allow decoding the specific barcode content for the specific product related to the specific barcode content.

Further, a specific relationship between the barcode content and the corresponding barcode is usually denoted by the term "symbology". Herein, a specification of the symbology may comprise information referring to a manner of encoding the data and related attributes, such as start and stop markers in bars and space, sizes of zones before and after the barcode, etc. In general, the barcode may be one of a "linear barcode", also denominated as a "one-dimensional barcode", which represents data by varying a width and a spacing of parallel lines, a "two-dimensional barcode" which represents data within an arrangement of bars, rectangles, squares, hexagons, or any other geometric pattern being distributed over a limited two-dimensional area, and a "dot code" which comprises a specific number of dots distributed again over a limited two-dimensional area. According to the present invention, a standard barcode is, preferably, used which is generated according to a barcode standard specification. World-wide, a number of barcode standard specifications are used nowadays, however, the barcode standard specification may, preferably, be selected from the group consisting of:

a linear barcode 128, as defined according to ISO/IEC 15417;

a data matrix barcode, as defined according to ISO/IEC 16022; and a QR barcode, as defined according to ISO/IEC 18004.

However, other barcode standard or non-standard specifications which may allow generating a barcode being adapted to perform any of the methods according to the present invention may also be used.

Thus, the barcode may, in particular, comprise a plurality of modules. As further used herein, the term "module" or "cell" refers to the smallest unit within the barcode being capable of representing data in a fashion that the data may be optically read by a machine. In a preferred embodiment, the module may, thus, comprise a binary field, such as a bar, a rectangle, a round dot, an oval dot, a square, a hexagon, or any other geometric pattern, the area of which is filled with a specific color which is optically distinguishable by the machine from adjacent modules. For simplicity, each module may either comprise a black area, a white area, or an area in a specific color, or the opposite filling thereof, i.e. a white area, a black area, or a colored area in a different color, preferably in a complementary color with respect to the specific color. While in a one-dimensional barcode the modules may be arranged one after the other in a line within the barcode whereas, in a two-dimensional barcode, the barcode may, thus, be described as a two-dimensional matrix consisting of rows and columns of modules.

According to step i), the barcode additionally exhibits the function for being used in serializing a number of products by using a specific kind of barcode. As generally used herein, the term "serialize" refers to providing a different barcode content for each individual product out of a number of products, preferably out of a number of identical or similar products, which are individually marked by using the barcode in this fashion. For this purpose, a print batch data comprising a batch of serial codes and at least one individual security rationale is provided by a central database. As used herein, the term "print batch data" refers to an individual set of data comprising a batch of serial codes and the at least one individual security rationale which is assigned to the corresponding batch. For this purpose, the batch of serial codes comprises a range of sequential serial numbers, which are, subsequently, assigned to each of the individual products out of the number of products, whereby the number of the products is serialized. In a simplified example similar to FIG. 9 below, the batch of serial codes which is used for serializing five identical products may comprise the sequential serial numbers 1000, 1001, 1002, 1003, and 1004, which may, consecutively, be assigned to the five products which are, after serializing, individually addressable. Thus, the range of sequential serial numbers by which the barcode is individualized in a specific manner is defined in the print batch data. It may be emphasized here that no encryption of the serial numbers may be required for the purposes of the present invention.

As further used herein, the term "central database" refers to a data storage device being capable of storing the print batch data or a reference thereto. In this regard it may be mentioned that for storing the batch of serial codes which are comprised in the range of the sequential serial numbers, it may be sufficient to store a starting point of the range and an end point of the range in order to accomplish an unambiguous reference. Further, in case a fixed size may be used for different batches, the starting point of the range or, alternatively, a batch number may even be sufficient. Compared to the usual application of random serial numbers which require being stored individually in the central database, the use of sequential serial numbers may, thus, considerably reduce an amount of memory space for storing the print batch data in the central database.

For the purposes of the present invention, the physical arrangement of the central database is of no particular relevance. The central database may, thus, be part of a data server or may occupy memory space in a web-based cloud. In particular, the latter embodiment may provide a number of advantages, such as high scalability with respect to different batch sizes and high availability with regard to access from different locations. Further, it may be advantageous to concurrently store the print batch data in more than one central database in order to generate a spatial redundancy of the print batch data. Further, the central database may comprise a number of separate repositories which may be used for one or more of: for different clients, for different purposes, or for different batch sizes. Further, the actual print batch data, i.e. the set of data comprising the batch of the actually used serial codes and the actually selected individual security rationale as assigned to print batch data, may also be stored on or copied to a portable data storage device, such as a portable hard-disk or a USB stick, wherein the USB stick may operate according to any USB mass storage device class standard as previously or prospectively defined.

As already mentioned above, since serialization, although being effective for fighting criminal activities in the supply chain, has turned out not to be effective enough against counterfeiting, providing an additional mechanism that would allow differentiating between an original barcode and a copied barcode is still desired. Therefore, further according to step i), the print batch data as provided by the central database does not only comprise the batch of the sequential serial codes but, additionally, provides the at least one individual security rationale, wherein the at least one individual security rationale is assigned to the barcode. Herein, the at least one individual security rationale is used for modifying the barcode, whereby at least one specific attribute may, thus, be introduced into the printed barcode by applying the at least one individual security rationale for modifying the barcode in combination with a single serial number, which may also be denominated as "single serial code", out of the range of the sequential serial numbers, wherein the specific attribute may allow an identification of the individual product.

As further used herein, the term "individual security rationale" refers to instructions for modifying the barcode by introducing the at least one additional specific attribute into the printed barcode. For this purpose, the individual security rationale may be considered as a generalized function adapted for determining a manner and a place at which the barcode may be modified. In this regard, the combination of the single serial code and the individual security rationale may be considered as an input being capable of triggering the modification of the barcode which, thereupon, may actually be modified in the desired manner as an output. With respect to the present invention, it may be emphasized that not only the individual security rationale alone but a combination of the individual security rationale and the single serial code as selected from the batch of serial codes are used for modifying the barcode. As will be explained below in more detail, the modified barcode is, subsequently, printed on the product by using a printing device as described below in more detail. As used herein, the terms "modifying" or "modification" relate to a process of applying the single serial code and the individual security rationale to the barcode in a fashion that details of the barcode may be altered by introducing the at least one specific attribute into the barcode. Similarly, the term "modified" refers to the result of the modification.

By way of example, the at least one individual security rationale may comprise a random identifier which is used for initializing a pseudorandom generator. Herein, the random identifier may comprise a number, which may also be denominated as a "secret key" or, as a "seed", that may be capable of initializing a pseudorandom generator. However, other kinds of identifiers may also be applicable, such as a sequence of letters or an alphanumeric string. For this purpose, the pseudorandom number generator may use the random identifier as a start value in order to generate a series of pseudorandom numbers which may, according the present invention, be used for modifying the single serial code. By using the same random identifier in a deterministic random number generator, a series of pseudorandom numbers may be obtained. In cryptography, random numbers are, generally, generated in order to provide a key for an encryption of data. Herein, the random identifier used for this purpose may, preferably, be a random number in order to prevent guessing the key by a third person. By way of example, the random number may be generated by using random parameters within a computer program, such as a movement of the mouse or a time lag between two successive keyboard entries. However, other ways of generating the random number may also be feasible. In order to maintain a confidentiality of encrypted data, a disclosure of the random identifier is generally avoided.

Thus, the at least one individual security rationale as provided by the print batch data may automatically be generated, e.g. by using a random generator. Thereby, for each individual batch a different individual security rationale may be assigned to the batch of serial codes in this manner. In case, a print batch may, however, be divided into a multitude of sub-batches, for each sub-batch a different individual security rationale may be provided. However, for the purposes of the present invention, each sub-batch may also be denominated as batch since the size of the batch is of no importance.

In a particular preferred embodiment, the at least one individual security rationale may be selected in order to maintain a readability of the modified barcode being printed on the product. As used herein, the term "readability" refers to a quality of the printed barcode with regard to a perceptibility of the barcode content from the printed version of the barcode by using a machine. Thus, the readability of the modified barcode is considered as maintained in a case in which the same barcode content may be decoded from the modified barcode and the unmodified barcode. In general, the readability of the barcode may be measured by at least one quality grade as defined in a barcode standard specification. By way of example, the individual security rationale may be selected without reducing the barcode grades, such as the grades specified in ISO/IEC standards 15415 or 15416, in a manner that the quality grades may exceed a threshold as defined by at least one of an ISO standard specification or a GS1 standard specification. Thus, the individual security rationale may, preferably, be adapted to modify the printed barcode in a fashion that, concurrently, the readability of the barcode is maintained. Preferred embodiments of individual security rationales which may, in particular, be used for this purpose are described below in more detail.

According to step ii), the print batch data are transmitted to the printing device, wherein the printing device is, preferably, designed for printing variable data in at least one remote location. In a particularly preferred embodiment, the print batch data as generated during step i) may be transmitted to the printing device via one or more channels selected from: a wireless data transmission, a wire bound data transmission, a transmission via a computer network, such as the internet or an intranet. Hereby, the exact details and manners of the transmission are of little relevance as long as the generated print batch data are actually transmitted to the printing device. As already indicated above, the print batch data is a set of variable data which comprises the selected batch of serial codes and the at least one individual security rationale, wherein the at least one individual security rationale is assigned to the barcode. Herein, the serial codes vary from one barcode to another while each serial code may further be modified by a combination of the single serial code and the individual security rationale used as the input for a barcode modification. For the purpose of printing the modified barcode on the product, the printing device is, therefore, designed for printing variable data.

However, a number of printing technologies, such as offset printing, are not adapted for printing variable data. Therefore, a printing technology which allows printing a variable barcode content has to be used in the printing device. Preferably, a continuous inkjet printer, a cartridge inkjet printer, a drop-on-demand printer, a digital printer, or a laser printer may be used for this purpose. In particular, inkjet coding or laser coding technologies, may be employed. Generally, these kinds of printing technologies exhibit a comparatively low printing resolution, typically 300 dpi or less. Nevertheless, as these kinds of printing technologies may be digitally controlled, they, basically, allow printing any desired image. By using the printing device designed for printing variable data it may, thus, be feasible to introduce the at least one additional specific attribute into the printed barcode image in a manner that the printed barcode may be individually identifiable.

In a particular embodiment, an event that a nozzle of a cartridge inkjet or a drop-on-demand printer may clog may be taken into account. As a result, white stripes which may be caused by the clogged nozzle may separately be identified by a vision system, whereupon the barcode may be corrected, accordingly.

Thus, in accordance with step iii), a modified barcode is generated by applying a combination of the single serial code and the at least one individual security rationale as provided by the print batch data. As already mentioned above, the single serial code is selected out of the range of the sequential serial numbers and assigned to the barcode together with the corresponding individual security rationale. Subsequently, the modified barcode which is generated in this fashion is printed on the product. As a result of the printing, an authentication feature is, thus, introduced into the printed barcode by which the product already is concurrently serialized. In this regard it may be emphasized that this method according to the present invention allows individualizing a single product by simultaneously furnishing it with a serial number and an authentication feature both comprised in an individualized barcode. This kind of combination, thus, enables enhancing the security of the individualized barcode not only by detecting the barcode content but by concurrently allowing a differentiation between an original barcode and a copied barcode.

As used herein, the term "authentication feature" refers to the at least one additional specific attribute which is introduced into the barcode, wherein the authentication feature corresponds to a modification which is introduced into the barcode by applying the printing device, wherein the modification within the barcode is a function of the selected single serial code and the individual security rationale. After introducing the authentication feature into the barcode, the barcode content of the modified barcode, in particular the serial number related to the serialized product, may still be individually identifiable in the same way as in the unmodified barcode, i.e. in the same manner as in a barcode that may not comprise an authentication feature being introduced according to the present invention. As a result, the at least one additional specific attribute does not affect the usual process of decoding the barcode content according to the known related specification of the barcode whereas the at least one additional specific attribute may still be determinable by applying the method for checking the authenticity of the barcode used in serializing products as described below in more detail.

In this regard it may be emphasized that the present method may, preferably, be independent from whether the authentication feature as used herein may be a hidden authentication feature or not, i.e. an obvious authentication feature. In particular, in the embodiment as described below in which the modified barcode may be obtained by employing at least one padding code word, the authentication feature, although being an obvious authentication feature, may, nevertheless, not affect the usual process of decoding the barcode content. However, hidden authentication features may also be used for the purposes of the present disclosure.

In a particularly preferred embodiment, the method for serializing products by using a barcode may be part of one or more of a production process for producing the product, a process for producing an article accompanying the product, or a packaging process for packaging the product. This kind of performance particularly may ensure that a large number of products may be equipped with a serialized barcode with little or no time delay, preferably directly within a production line or a packaging line. Such an approach may particularly be useful for decreasing the hazard of counterfeit products by opening the opportunity to check the authenticity of the barcode in a serialized product by applying the respective method as presented below.

In a further aspect of the present disclosure, a method for checking the authenticity of a barcode used in serializing products is disclosed. Herein, the barcode under investigation is a modified barcode, wherein the modified barcode comprises an authentication feature, wherein the authentication feature has previously been introduced into the barcode by applying the method for serializing products by using a barcode as described elsewhere in this document. As already described above, the present method comprises the following steps step a) to e). Herein, steps a) to e) are preferably performed in the given order. Further, it may be feasible to perform two or more of the steps simultaneously or in an overlapping fashion. Further, it may also be feasible to perform one, two or more of the steps repeatedly, not depending on the fact whether other steps may be equally repeated. Further, additional steps, such as additional step f) or other steps which are not mentioned herein, may be included.

Accordingly, the method for checking the authenticity of a barcode used in serializing products, wherein the barcode under investigation is a modified barcode, comprises the following steps:
a) taking at least one image of a modified barcode by using a digital imaging device;
b) processing the image by identifying the modified barcode in the image, and submitting the image to a central database;
c) reading out a barcode content of the modified barcode, whereby a single serial code of the product is decoded; using a number range of the single serial code for identifying a print batch and at least one assigned individual security rationale; analyzing the at least one security rationale in the modified barcode;
d) comparing the individual security rationale analyzed in the modified barcode with the individual security rationale from the print batch, and, if the two individual security rationales are identical, generating a message that the barcode under investigation is an original barcode, otherwise generating the message that the barcode under investigation is not the original barcode; and
e) storing the message in the central database and sending it to a querying party.

More specifically, the method for checking the authenticity of a barcode used in serializing products, wherein the barcode under investigation is a modified barcode, may comprise the following steps:
a) taking at least one image of a modified barcode by using a digital imaging device;
b) processing the image by identifying the barcode in the image, and submitting the image to a central database;
c') reading out a barcode content of the modified barcode, whereby a single serial code of the product is decoded; using a number range of the single serial code for identifying a print batch and at least one assigned individual security rationale; regenerating the modified barcode by using the single serial code and the at least one assigned individual security rationale;
d') comparing the barcode under investigation with the regenerated modified barcode, and, if the two barcodes are identical, generating a message that the barcode under investigation is an original barcode, otherwise generating the message that the barcode under investigation is not the original barcode; and
e) storing the message in the central database and sending it to a querying party.

Herein, the method for checking the authenticity of a barcode used in serializing products comprises the same steps a), b), and e) in both versions while steps c') and d') may be considered as an embodiment for determining a measure that may be used for comparing the barcode under investigation with the original barcode which is closely related to steps c) and d). Further details with respect to the two embodiments and their respective relationship are provided below.

According to this aspect of the present disclosure, this method is configured for checking the authenticity of a barcode being used in serializing products by a querying party. As further used herein, the term "authenticity" refers to an estimation whether the barcode under investigation can be considered as the original barcode or not, wherein the barcode may be denoted as a "copied barcode" in the latter case. On one hand, the barcode may be considered as the original barcode in a first event in which both the original barcode content and the applied at least one individual security rationale can still be analyzed from the barcode. Alternatively, in the first event the modified barcode that is regenerated from the single serial code and the at least one individual security rationale as analyzed from the content of the modified barcode on the product is still identical with the modified barcode on the product. In this regard it may be emphasized that the at least one individual security rationale cannot be obtained by investigating the barcode alone which, thus, may prevent an application of reverse engineering in order to obtain the individual security rationale. On the other hand, the barcode may be considered as a copied barcode in a second event in which at least one of the original barcode content and the applied at least one individual security rationale cannot be analyzed from the barcode. Alternatively, in the second event the modified barcode that is regenerated from the single serial code and the at least one individual security rationale as analyzed from the content of the modified barcode on the product is not identical with the modified barcode on the product. Thus, the term "checking" refers to one or more of confirming the authenticity of the product, discarding the product comprising the copied barcode, or finding an answer to an open question whether the product under investigation may be the original product to be verified or a counterfeit product pretending to be the original product.

According to step a), at least one image of the modified barcode is taken by using a digital imaging device. As used herein, the term "image" refers to an optical image of the printed modified barcode or a part thereof which is taken by using an optical system. As further used herein, the term "taking an image" refers to a process of recording the optical image of the printed modified barcode or the part thereof. Hereby, the image may, preferably, refer to a digital image, i.e. a one-dimensional or a two-dimensional representation which comprises a number of pixels in each dimension that together form the image of the printed modified barcode. After recording, the digital image may constitute a basis for further processing and analyzing the image, in particular, in order to extract data related to both the barcode content and the security rationale as comprised therein.

As further used herein, the term "digital imaging device" refers to an optical system adapted for taking the digital image of the printed modified barcode or the part thereof. Thus, in a preferred embodiment, the digital imaging device as employed for performing this method may comprise at least one optical element being selected from the group consisting of: a cell phone camera, a smart phone camera, a tablet camera, a flatbed scanner, a hand scanner, a barcode scanner. Herein, the digital imaging device may comprise a resolution of 20 pixels per module per dimension or less, such as 3 to 15 pixels per module per dimension, preferably 4 to 10 pixels per module per dimension, most preferably 5 pixels per module per dimension. In particular, the cell phone camera, the smart phone camera, the tablet camera may be integrated into a portable electronic device, i.e. a cell phone, a smart phone, or a tablet computer. However, other kinds of digital imaging devices may also be used for the purposes of step a).

According to step b), the image is processed by identifying the barcode in the image and, further, sent to a central database. As used herein, the term "processing an image" refers to a method by which the image taken by the digital imaging device is altered, in particular, in order to improve an extraction of desired features from the image, in particular by cropping not relevant information from the barcode and, optionally, compressing the image. In a preferred embodiment, step b) may, thus, comprise at least one of the following sub-steps b1) to b4):
b1) locating the image;
b2) rearranging a spatial orientation of the image;
b3) cutting or cropping at least at one side and/or at one edge;
b4) transforming the image into a binary format.

According to sub-step b1), the image of the printed modified barcode may be located within a larger picture taken by the digital imaging device, whereby the larger picture may not only comprise the image of the printed modified barcode but also additional features. However, in case the larger picture may comprise the image of the printed modified barcode, the image of the printed modified barcode may be localized and defined, for example, through its coordinates or other specifications with regard to the position and/or rotation of the image.

In particular in order to extract the image of the printed modified barcode from the larger picture, at least one of sub-steps b2) or b3) may be applied. According to sub-step b2), the image may be rearranged with respect to a spatial orientation within the larger picture whereas, according to sub-step i3), the larger picture may be cut or cropped at least at one side and/or at one edge, whereby the image of the printed modified barcode may be acquired without the additional features that might be able to disturb the further processing of the image. As further used herein, the rearranging of the spatial orientation of the image may comprise at least one tilting step by which the at least one axis of the image may be aligned with a usually linear orientation (in one dimension) or with a usually rectangular orientation (in two dimensions) of the barcode. In the case of two dimensions, the two-dimensional picture may comprise two axes being lines crossing each other, thereby generating an angle with respect to each other, wherein the angle may, preferably, take a value of 90°, whereby, however, other values of the angle may be possible. As further used herein, the "cutting of the picture" may include a cutting step or a cropping step during which a part of the features within the picture may be removed from the larger picture usually along at least one straight line which may discriminate respective parts.

According to sub-step b4), the image of the printed modified barcode may be transformed into a binary format. Using this transforming step, the information comprised within the image may generally be reduced in a manner that a specific module within the image may only take one of two values of a Boolean variable, such as TRUE or FALSE, 1 or 0, black or white, or any other suitable designation.

In a further preferred embodiment, which may be particularly applicable to an image taken by the camera of a smartphone or a cell phone, the following procedure may be applicable for a quick and efficient analysis of the image of the printed modified barcode. Within a first sub-step, the image of the printed modified barcode may be isolated from remaining parts of the picture as taken by the cell phone camera, particularly by disregarding the remaining parts of the picture such as described above. Consequently, any poor quality and/or low resolution which might occur within the remaining parts of the picture may, thus, be excluded from disturbing the further processing of the picture. Thereafter, at least one of the following sub-procedures may be performed with regard to the picture of the printed version of the data matrix barcode:
verifying a correct exposition of the image;
examining a distribution of an illumination over the image;
reviewing a contrast of the image;
disproving an existence of a blur, such as a motion blur and/or a focus blur, within the image.

Hereby, the exposition, the illumination, and the contrast of the image are defined as usually in imaging. The exposition of the image may, thus, be corrected in a fashion that the image of the printed modified barcode is fully depicted in the picture. Further, the illumination of the picture may, thus, be evenly distributed over the area of the image within a given range of tolerance. Further, the contrast of the image may, thus, exceed a predetermined threshold. Blurring usually occurs due to an aberration, such as caused by recording the image being out of focus. Consequently, any measure adapted for adjusting the focus into the plane of the image of the printed modified barcode may, additionally, applied.

Herein, a performance of each of these sub-procedures may be particularly adapted for being employed to the analysis of the image of the printed modified barcode thereby taking into account its binary nature. In case any one of the sub-procedures may not provide a result capable of providing a reasonable quality and a sufficient resolution, the image may be rejected and a querying party may be requested to take a further image by the digital imaging system. This procedure may be repeated unless the image of the printed modified barcode may exhibit a reasonable quality and a resolution sufficient for its further processing. In addition, the image may be further processed by applying one or more of the sub-steps b1) to b4) as described above.

Further according to step b), after processing the barcode comprised within the image, the image of the modified barcode under investigation is submitted to a central database. For further details related to the central database reference may be made to the description elsewhere in this document.

According to step c) or step c'), the image of the modified barcode under investigation, which has been submitted to the database during the step b), is processed in a manner that the barcode content is acquired by using the central database. As already mentioned above, knowing a specific barcode may allow decoding the specific barcode content for the specific product related to the specific barcode content. As further described above, a different barcode content is provided for each individual product out of a number of products. Thus, by using a number range of the serial number a single serial code may be identified. Further, by knowing the single serial code the corresponding print batch of serial numbers and, therefrom, the at least one individual security rationale is, thus, determined.

Further according to step c), after determining the single serial code and the at least one individual security rationale assigned to the batch of serial numbers to which the single serial code belongs to, the at least one individual security rationale is analyzed from the modified barcode that has been acquired according to step a) and processed and submitted to the central database according to step b). For this purpose, the modified barcode is analyzed in a manner that the at least one individual security rationale which has been used earlier for printing the modified barcode on the product according to step iii) is obtained for comparison purposes during step d). Herein, this kind of analysis may, preferably, be performed by means of adapted image analysis algorithms. By way of example, an image of the modified barcode as taken with a digital imaging device, such as a camera, may be analyzed by means of one or more image analysis methods to determine a property of the modules in the barcode, such as the width of the modules in the barcode, in order to identify a distribution of different kinds of modules within the barcode, wherein the individual security rationale is obtained from the analyzed distribution.

As a result of the steps a), b) and c), the at least one individual security rationale of the modified barcode under investigation as well as the at least one individual security rationale stored in the central database for the product with the same single serial code have been acquired. During subsequent step d), this result is employed to determine on this basis whether the barcode under investigation is the original barcode or a copied barcode. For this purpose, the at least one individual security rationale as determined from the barcode under investigation as printed on the product is, according to step d), compared with the at least one individual security rationale that has been stored in the central database together with a reference to the batch of the sequential serial numbers to which the single serial code that has been printed on the product belongs to.

In a particularly preferred embodiment, the at least one individual security rationale and the single serial code as determined from the print batch in the central database may be used together for regenerating a modified barcode according to step c'). As used herein, the term "regenerating the modified barcode" relates to a process by which the at least one additional specific attribute that has been introduced into the barcode according to step iii) may be obtained by creating a further modified barcode by using a combination of the single serial number as determined from the barcode under investigation as printed on the product and the at least one individual security rationale which has been determined by using the same single serial number in order to acquire the print batch and, consecutively, the assigned individual security rationale in the central database. Thus, step c') may, preferably, be performed in a similar manner as described above with respect to generating the modified barcode in accordance with step iii), wherein a modified barcode is generated by applying a combination of the single serial code and the at least one individual security rationale as provided by the print batch data without, however, printing the modified barcode generated in this fashion on the product.

As a result of the steps a), b) and c'), the regenerated barcode based on the single serial code as decoded from the barcode content and the at least one individual security rationale as determined by using the single serial code in the central database have been acquired. During subsequent step d'), this result may be employed to determine on this basis whether the barcode under investigation is the original barcode or a copied barcode, wherein the acquired regenerated barcode is compared with the modified barcode under investigation as printed on the product. Herein, this kind of analysis may, preferably, be performed by means of further adapted image analysis algorithms. For this purpose, an image of the modified barcode as taken with a digital imaging device, such as a camera, may be compared with a further image as created for the regenerated modified barcode.

Thus, step c') may be considered as, indirectly, determining the at least one individual security rationale by applying the at least one individual security rationale in reconstructing the modified barcode while step c) may be considered as, directly, determining the individual security rationale from the modified barcode. While the above-described comparison according to step d) may employ one or more algorithms especially adapted for acquiring information, in particular the at least one individual security rationale, from the image of the modified barcode, the comparison according to step d') may be performed by one or more algorithms especially adapted for detecting differences, such as slight differences, between two closely related images. Therefore, while both alternatives may be feasible, the one or the other alternative may, depending on the particular embodiment as selected for the individual security rationale, be preferred for practical reasons, such as due to speed or accuracy of evaluation.

Consequently, the present method is adapted to check for the product under investigation whether the acquired single serial code as decoded from the modified barcode under investigation is within the range of the sequential serial numbers as provided by the central database and whether the at least one individual security rationale as analyzed from the modified barcode under investigation are identical with the stored individual security rationale as provided by the central database. In case the single serial code is within the range of the sequential serial numbers and the two kinds of individual security rationales are identical, a message is generated that the barcode under investigation is an original barcode, while otherwise the message is generated that the barcode under investigation is not the original barcode. For this purpose, the acquired combination of the single serial number and the at least one individual security rationale as determined by steps a) to c) is compared with the stored range of the sequential serial numbers and the at least one individual security rationale as provided by the central database within a comparing step. In a particularly preferred embodiment, an image of the barcode under investigation as acquired during steps a) and b) is compared with the regenerated modified barcode as created by using the single serial code and the at least one assigned individual security rationale according to step c') within a comparing step. As further used herein, the "comparing step" includes verifying whether the single serial code is within the range of the sequential serial numbers and directly or indirectly comparing the at least one acquired individual security rationale of the barcode under investigation with the stored individual security rationale as applied to the original barcode being stored in the central database with regard to their identity, whereby at least one tolerance level can be taken into account within which the authenticity of the barcode under investigation may be still assumed. Herein, the tolerance level may depend on the actual embodiment which has been chosen for the actual individual security rationale as described below in more detail. As a particular advantage, introducing the tolerance level may allow taking into account inevitable adverse effects on the barcode under investigation, wherein the adverse effects, such as deterioration, ageing, or wear, may particularly affect the barcode which may be located on the surface of the product.

Further according to step e), the message may comprise a Boolean value which may be designated by TRUE or FALSE, by 1 or 0, or by any other designation which may be suitable to express a content of the message as determined by performing the present method. In addition, the message may further be processed, in particular, by transmitting it to a user interface where it may be expressed in a more user-friendly fashion, such as by displaying it as a plain text to the querying party. As further used herein, the term "querying party" may refer to a person who or to a machine which may be performing the present method by processing the barcode under investigation, accordingly.

In a particularly preferred embodiment, the message may be displayed on a display of a portable electronic device which also comprises the digital imaging device that is employed by the querying party for performing the present method, in particular, on a screen or a touchscreen of the cell phone camera, the smart phone camera, or the tablet camera by which the image of the barcode under investigation has actually been taken. For this purpose, a specific application, also abbreviated to as "app", may be run on the portable electronic device, wherein the application may be configured for interaction with the querying party, including taking the image, processing the image, starting a query to the central database, receiving a response from the central database, and displaying the message. However, other digital devices may also be used for displaying the message to the querying party.

Thus, the present method may further comprise a transmission step by which, preferably during or after step b), data may be transformed to a data processing unit via a computer network, such as the internet or an intranet, in such a manner that the further steps c) and d) after the transmission may be performed by the data processing unit, wherein the acquired message may be returned by the data processing unit during step e). As mentioned above, the transmitting step may, particularly, be performed by an application, also abbreviated to "app", which may be adapted to perform or to have performed at least partially method steps a), b), and e) as well the data transmission. The application may be run on a computer on a micro-computer, wherein the micro-computer may be part of the optical system, of a system which may control the optical system, or of a system which may be in connection with the optical system, or on a portable electronic device as described above which may be equipped with the digital imaging device. In this particular embodiment it might be advantageous that the data processing unit may operate in connection, in particular in close connection with the central database, such as being located within the same server or the same cloud.

Further, the message may be applied by the querying party for any subsequent purpose, e.g. as an entry into a specific database which may comprise such kind of values, for producing an optical signal or an audio signal, or a signal of any other kind upon determining the barcode under investigation to be a copied barcode, or for separating the product on which a copied barcode may have likely been printed from an inspection line. However, the present method may be applied under various other circumstances and for any other purpose, which may particularly be based upon any specific need of the querying party.

In a particularly preferred embodiment, it may, according to step f), additionally be checked whether the database has been queried before with respect to the single serial code as decoded from the barcode under investigation. This additional step may, preferably, be applied in a case in which the comparing step could confirm the authenticity of the barcode under investigation. For this purpose, serial numbers which have already been decoded can be stored in a separate number database, which may, preferably, constitute a partition of transaction data as stored in the central database or a respective repository thereof. Herein, the number database may be used in order to check whether the same barcode may have been queried before. If applicable, the number database may, in particular, be used for checking how many times the same barcode may have been queried before. For this purpose, a threshold number, in particular a positive natural number, such as 2, 3, 4, 5, 6, or more, may be used, wherein the threshold number may be selected in order to indicate whether a repeated checking of the same serial number may be considered as being indicative of fraud or not. In addition, it may, further be checked hereby how many previous queries have been performed within which time interval, which may be used for similar purposes. If applicable and if a number of queries may be above the selected threshold number, the message as provided to the querying party according to step e) may be modified by comprising a warning.

For further details concerning the barcode, the barcode content, the modified barcode, the product, the serializing, the serial code, the individual security rationale, and the central database, reference may be made to the disclosure of the method for serializing products by using a barcode as described elsewhere in this document.

In a further aspect of the present invention, a method for aggregation of sequentially serialized products, which have, preferably, been serialized by using serial numbers as described elsewhere in this application, is disclosed. As generally used, the term "aggregation" refers to a compilation of products which are compiled into a common item, in particular, as a number of products arranged on a pallet or placed in a shipping case. However, other kinds of common items may also be applicable. Herein, the method for the aggregation of the sequentially serialized products comprises the following steps:

iv) scanning serial numbers of the sequentially serialized products;
 v) storing the scanned serial numbers in a central database;
 vi) sorting the stored serial numbers with respect to a sequential order;
 vii) grouping the sorted serial numbers into contiguous number ranges;
 viii) identifying a root value and a size-related value for each contiguous number range; and,
 ix) for each contiguous number range, storing the root value and the size-related value of each contiguous number range.

Herein, the sorting of the stored serial numbers according to step vi) may be performed in an increasing order or in a decreasing order. As a result, the contiguous number ranges into which the sorted serial numbers have been grouped may at least comprise a single item if no adjacent number may be available; otherwise, if at least one adjacent number may be available, at least two items are grouped within the contiguous number range. Consequently, the root value may, thus, relate to the first item or the list item within a selected contiguous number range, whereas the size may refer to the number of items which are grouped within the selected contiguous number range. This particular method which may, especially, be applicable to aggregated products which have been serialized by the serializing method according to the present invention, may allow saving a considerable volume of storage space for storing the serial numbers of the aggregated products.

In a further aspect, the present application discloses and proposes a computer program, including computer executable instructions for performing both the method for serializing products by using a barcode and the related method for checking the authenticity of the barcode used in serializing products, when the program is executed on a computer or a computer network, such as the internet or an intranet. Preferentially, the computer program may be stored on a computer readable data carrier. Within this regard, the present disclosure further discloses a data carrier having a data structure stored thereon, which, after loading into a computer or a computer network, is capable of executing any or all methods as disclosed herein. As further used herein, a computer may comprise any device which may be capable of storing data and/or performing calculating steps and/or instructing steps. By way of example, this definition may not only include work stations, notebooks, tablets, and smart phones but also application-specified integrated circuits (ASICs) and field-programmable gate arrays (FPGAs). Preferably, one or more of the method steps or even all of the method steps of any or all methods disclosed herein may be performed by using a computer or a computer network. Thus, generally, any of the method steps including provision and/or manipulation of data may be performed by using a computer or a computer network.

In a further aspect, the present invention discloses and proposes a data carrier having a data structure stored thereon, which, after loading into a computer or computer network, such as into a working memory or main memory of the computer or computer network, may execute any or all methods according to one or more of the embodiments disclosed herein.

In a further aspect, the present application discloses and proposes computer program product with program code means stored on a machine-readable carrier, in order to perform any or all methods according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Preferentially, the computer program product may be distributed over a data network.

In a further aspect, the present application discloses and proposes a modulated data signal which contains instructions readable by a computer system or computer network, for performing any or all methods according to one or more of the embodiments disclosed herein.

As mentioned above, various preferred embodiments, in particular the embodiments as disclosed in one or more of the Figures below, may be applicable, depending on the barcode symbology and the printing technology, for introducing the authentication feature in the barcode, whereby the modified barcode is generated. For this purpose, the modified barcode is generated by applying a combination of the selected serial code and the at least one individual security rationale, wherein the modified barcode is, subsequently, printed on the product by employing the selected printing device.

In a first group of embodiments, the barcode may be a two-dimensional barcode. Herein, the barcode may comprise a plurality of two-dimensional modules, wherein the modules are arranged in rows and columns. Alternatively, the barcode may comprise a plurality of dots arranged within a two-dimensional area. However, further kinds of two-dimensional barcodes may also be feasible. By way of example, the standard for a Data Matrix barcode in the ECC 200 version defines the number of modules to only be a multiple of even numbers that may range from 10×10 modules to 144×144 modules, e.g. 8×18 modules, 16×48 modules, 22×22 modules or 24×24 modules, which may provide a rectangular or, preferably, a square, shape, respectively. However, other kinds of module arrangements in the Data matrix barcode may be possible. Without restricting further possible arrangements, this group of embodiments is described in the following with reference to the barcode comprising the plurality of two-dimensional modules.

In a first preferred embodiment, the modified barcode may be printed in a resolution which may not allow assigning an identical number of pixels to every module. For this purpose, the modified barcode may be printed by using at least two different kinds of modules, wherein a different number of pixels may be assigned to each kind of modules. Herein, a repartition of the different kind of modules may be defined by the individual security rationale. As used herein, the term "repartition" may refer to a fashion in which the at least two different kinds of modules are actually distributed over the area of the barcode. By way of example, for printing a 10×10 mm barcode of 16×16 modules at 300 dpi, an average number of pixels for one module can be calculated as approximately 7.38. However, the printing technology as described above may allow printing only an integral number of pixels, such as either 7 pixels or 8 pixels. As a consequence, the printer driver software may be calculating a width of 7 pixels for a first kind module and a width of 8 pixels for a second kind of module in order to approach the calculated value of 7.38 as close as possible. For repartition, the individual security rationale may cover position information for a distribution of the first kind of modules and of the second kind of modules over the barcode, in particular for one or more of: at least one individually selected module, at least one entire row of modules, at least one entire column of modules. However, other kinds of distributions may also be feasible, such as using more than two kinds of modules that exhibit an individual width.

In a further preferred embodiment, the barcode may be modified by using at least one padding code word or empty code word. Herein, the individual security rationale may be used in order to alter the padding code word. In general, a capacity of a two-dimensional barcode may depend on a number of the modules in the barcode. However, the volume of data encoded in a barcode may vary considerably. Therefore, a specific content may, generally, not require using the full capacity of a given barcode. As a result, an empty space in the barcode may be filled by empty code words, which may also be denominated as "padding code words". The individual security rationale for generating the padding code words may, thus, leave room for modifying the barcode by using a specific algorithm for calculating an individual padding code word content.

In a further preferred embodiment, the barcode serial number could be extended with an additional number. By way of example, the additional number may be placed at the end of the serial number or, preferably, at least one additional application identifier could be allocated with a number, wherein, in both cases, the number may be provided by using the serial code number and the individual security rationale as input for a pseudorandom generator that creates the number. By way of example, in the GS1 standard application identifiers 90 to 99 of the barcode specification which constitute an extension to the serial number can be arbitrarily configured by a user. As a result, at least one of the application identifiers 90 to 99 according to the GS1 standard specification may be allocated by using the individual security rationale. However, other kinds of extensions of the barcode may be feasible. This embodiment may be particularly advantageous since it may exclude a reverse engineering of the full barcode range because it seems not to be possible to guess the extension of the barcode for other serial numbers.

In a further preferred embodiment, the barcode may be modified by matching a distance between two adjacent modules in printing direction by overlaying a shaft encoder signal. Herein, the shaft encoder signal may be modified in printing direction by using a first modulation function. In particular for high-speed printing, continuous inkjet technology may often be used, wherein this technology may, however, be quite imprecise in an orthogonal direction with respect to a substrate movement while it may be quite precise in a direction of the substrate movement. Therefore, a modification of the barcode may, preferably, be implemented along the movement axis. Herein, the modification can be an overlay of a first modulation function to the shaft encoder signal. As used herein, the term "modulation function" may refer to an external signal that may comprise a time-varying amplitude, preferably selected from a sinus-wave type, a rectangular type, a triangle type, or a mixture of these types. Thus, a distance between the barcode columns and/or the barcode rows may accordingly be modified, whereby the modified barcode may be generated. Herein, the individual security rationale may be used for instructions with respect to one or more of the mentioned modifications.

In a further preferred embodiment, the barcode may be modified by printing at least one modified module, wherein a power of the printing device may be modified for printing the modified module, such as in one or more selected sectors of the barcode. As used herein, the term "sector" may refer to a partition of the barcode, in particular to a group of adjacent modules within the barcode. Herein, the modified module may comprise one of: a lower color density, a higher color density, a lower color dot diameter, higher color dot diameter. By way of example, a reduction of the power may result in a darker module and/or a smaller dot diameter. Alternatively, the barcode may be modified by increasing the laser power when printing a module in one or more selected sectors of the barcode. As a result, a more intensive module and/or an increased dot diameter may be obtained. Both kinds of modifications may be used on one or more modules in a two-dimensional barcode for modifying the barcode. Again, the individual security rationale may be used for instructions with respect to one or more of the mentioned modifications.

In a further preferred embodiment, the modified barcode may be printed by removing at least one defined pixel in at least one designated module which may be used in the printed pattern of the barcode. Herein, at least one defined pixel may be removed in one or more corners of two or more adjacent modules. However, removing other pixels from one or more modules may also be feasible. Further, this type of generating a modified barcode may also be applicable for a linear barcode, wherein the modified barcode may be printed by removing at least one defined pixel in at least one designated bar, wherein the at least one defined pixel may be removed in at least one corner of two adjacent bars. Also, here, removing other pixels from one or more bars may also be feasible. Similarly, as described above, the individual security rationale may be used for instructions concerning one or more of the mentioned modifications.

In a second group of embodiments, the barcode may be a linear barcode, wherein the barcode may comprise a plurality of bars having a height, a width, and a distance between two adjacent bars, wherein, in a single one-dimensional barcode, the height of the plurality of the bars is usually selected as being constant. Thus, the height of the bars may easily be modified in printing direction. For this purpose, the height of the bars may be modified by using a second modulation function, wherein the modulation function may again refer to an external signal as defined above. Alternatively, or in addition, the width of the bars or the distance between the bars may be modified in printing direction by using a different second modulation function as long as the readability of the one-dimensional barcode which is modified in this manner is not affected. Also, here, the individual security rationale may be used for instructions related to one or more of the mentioned modifications.

Further preferred embodiments of the present invention refer to an IT architecture that may be adapted for running a serialization system which may be configured for performing the methods according to the present disclosure.

The methods according to the present disclosure are considerably distinguished from known methods according to the state of the art and, thus, provide a number of advantages. In order to make copying serial numbers as difficult as possible, usually, random numbers are used for serialization purposes. However, the present methods make use of sequential numbers. Advantageously, sequential numbers require less address room, thus shorter serial numbers can be used, wherein defining number ranges may be very easy. As a result, the use of modified barcodes massively reduces the complexity of the IT infrastructure compared to existing serialization IT infrastructures.

In order to inhibit copying a whole range of serial codes, in most security serialization environments random serial numbers are used. However, copying serial numbers encoded in modified barcodes according to the disclosure is very cumbersome or even impossible. Therefore, it is not required to use random numbers for the serialization. Using sequential numbers offer several benefits. The definition of number ranges is very easy. This allows for a very transparent volume control of produced and/or coded products, which is important for reporting, e.g. to governmental agencies, such as in the case of cigarettes or alcoholic beverages where governments mandate reporting as a base for paying excise taxes. When sequential numbers are used, for each production batch or sub-batch an array of serial numbers are issued. For each batch or sub-batch, at least one individual security rationale that may relate to one or more additional specific attributes according to any one of the embodiments as described herein is assigned. Based on the individual security rationale, the applied printer is generating modified barcodes. For authentication of a modified barcode, the serial number is read out by decoding the barcode. As sequential numbers are used, it may be rather simple to identify the related serial number of the product and the assigned individual security rationale, which are then used to authenticate the barcode.

Summarizing the findings of the present disclosure, the following embodiments are preferred:

Embodiment 1

A method for serializing products by using a standard barcode comprising a unique printing modification for inhibiting a copying of the barcode, thereby allowing to use sequential serial numbers, the method comprising the following steps:

providing print batch data by a central database, the print batch data comprising a batch of serial codes and at least one individual security rationale for modifying the barcode, thereby assigning the security rationale to the barcode and defining a range of sequential serial numbers;

transmitting the print batch data to a printing device designed for printing variable data in at least one remote location; and printing a modified barcode by using a single serial code out of the range of the sequential serial numbers and the assigned individual security rationale as provided by the print batch data, whereby an authentication feature is introduced into the barcode.

Embodiment 2

The method of Embodiment 1, wherein the barcode is printed in a resolution which does not allow for assigning every two-dimensional barcode module an identical number of pixels.

Embodiment 3

The method of Embodiment 2, wherein larger and smaller modules are generated, wherein a repartition of the larger and the smaller modules in the barcode follows an individual, non-standard security rationale.

Embodiment 4

The method of Embodiment 3, wherein the security rationale covers position information for individually selected large and small modules.

Embodiment 5

The method of Embodiment 3, wherein the security rationale covers position information for an entire row and/or an entire column of modules in the barcode.

Embodiment 6

The method of Embodiment 1, wherein the barcode is modified by at least one padding code word which is altered according to the individual security rationale.

Embodiment 7

The method of Embodiment 1, wherein the barcode is modified by matching a distance between individual modules in printing direction by overlaying a shaft encoder signal by a specific modification function.

Embodiment 8

The method of Embodiment 1, wherein the barcode is modified by printing at least one designated module with lower or higher color density.

Embodiment 9

The method of Embodiment 1, wherein the barcode is modified by printing at least one designated module with lower or higher color dot diameter.

Embodiment 10

The method of Embodiment 8 or of Embodiment 9, wherein printing the designated module with the lower or the higher color density or lower or higher color dot diameter is achieved by reducing or increasing the power of a laser printer, respectively, when marking the designated module.

Embodiment 11

The method of Embodiment 1, wherein the barcode is modified by removing at least one defined pixel in the print of a designated barcode module.

Embodiment 12

The method of Embodiment 11, wherein at least one defined pixel is removed in each corner of adjacent modules in the print of the barcode.

Embodiment 13

The method of Embodiment 1, wherein a linear barcode is modified by matching the height of the barcode in printing direction to a specific modification function.

Embodiment 14

The method of Embodiment 1, wherein a continuous inkjet printer, a cartridge inkjet printer, a drop on demand printer, a digital printer, or a laser printer is used for printing the modified barcode.

Embodiment 15

The method of Embodiment 1, wherein, in the event a cartridge inkjet or drop on demand printer nozzle may clog, white stripes caused by the clogged nozzle are identified, whereupon the result of the vision system is corrected accordingly.

Embodiment 16

The method of Embodiment 1, wherein the individual security rationale is selected to maintain the readability of the barcode measured by a quality grades does not fall under a threshold defined by an ISO standard or an GS1 standard.

Embodiment 17

The method of Embodiment 1, wherein the method for modifying the barcode with a security rationale is applied to a linear barcode or to two-dimensional barcode.

Embodiment 18

The method of Embodiment 1, wherein the print batch data is divided into a multitude of sub-batches, each sub-batch having a different security rationale assigned.

Embodiment 19

A method for checking the authenticity of a standard barcode as used in serializing products, wherein the barcode comprises a unique printing modification for inhibiting a copying of the barcode, thereby allowing to use sequential serial numbers, the method comprising the following steps:

taking an image of the barcode by a querying party by means of a digital imaging device;

processing the image by identifying the barcode in the image, cropping not relevant information from the barcode, optionally compressing the image, and sending the image to a central database;

reading out a content of the barcode in the central database, thereby acquiring the serial number; searching, based on the number range of the serial number, the print batch ID and the assigned security rationale; and analyzing the security rationale;

comparing the security rationale from the analyzed barcode with a security rationale for the print batch ID in the database, wherein, if the two security rationales are identical, creating a message that the barcode under investigation is an original barcode;

checking in the database if the print batch ID has been queried before, wherein, if applicable, and if a number of queries are above a given threshold, a message comprising a warning is provided;

storing the message in the database and sending it to the querying party.

Embodiment 20

The method of Embodiment 19, wherein the image is taken by a cell phone camera, a smart phone camera, a tablet camera, a flatbed scanner, a hand scanner or a barcode scanner.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Further optional features and embodiments will be disclosed in more detail in the subsequent description of preferred embodiments. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION

Figure 1:
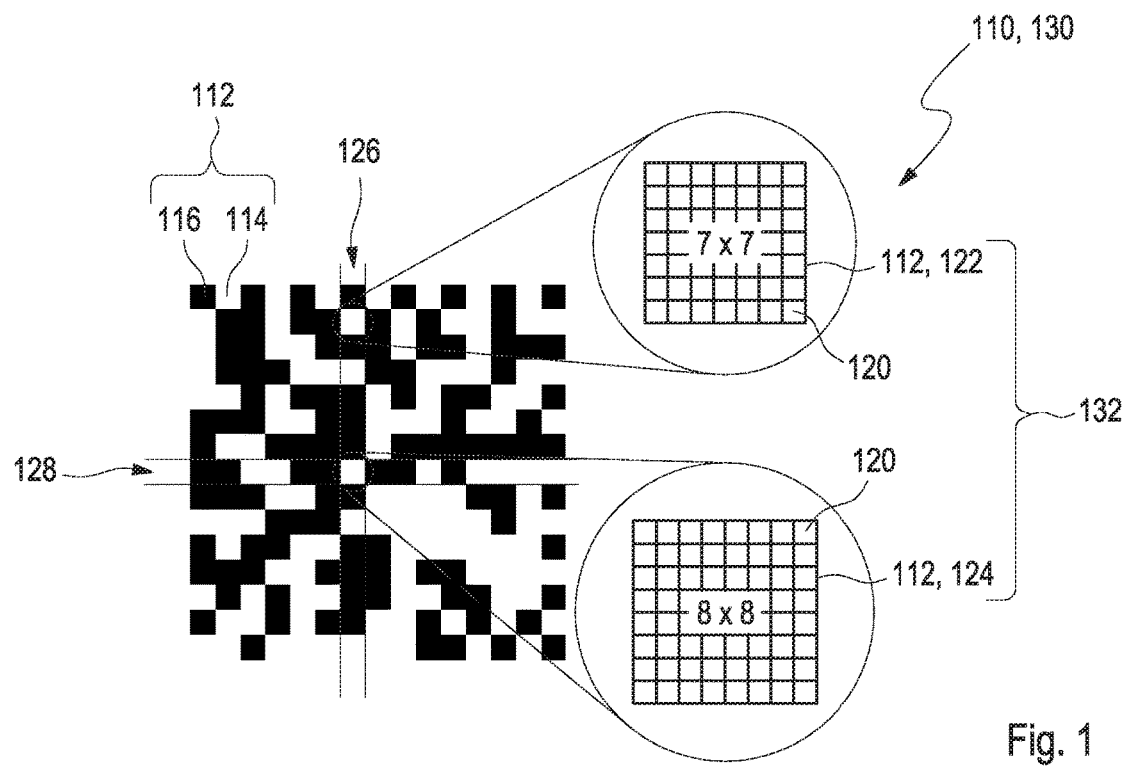
FIG. 1 illustrates a repartition of pixels in a barcode module.

FIG. 1 illustrates an embodiment of a two-dimensional barcode 110 which comprises a number of modules 112 arranged in an array-like fashion, usually denominated as Data Matrix barcode according to ISO 16022. Herein, a first kind of module 112 is implemented as black squares 114 while a second kind of module is implemented as white squares 116. In order to print the barcode 110 onto a product, a printing device 118 is used. Herein, the printing device 118 generates a number of pixels 120, wherein for printing each of the modules 112, generally, more than one pixel 120 is used. If the same number of pixels 120 is used per module 112, the size of the barcode 110 is defined as an even multiple of the number of pixels 120 per module 120 multiplied by the number of modules 112 within the barcode 110.

By way of example, an exemplary barcode 110 which comprises 20 modules 112 and 6 pixels 120 per module 112 exhibits an overall dimension of 20×6=120 pixels 120. Consequently, by printing the exemplary barcode 110 onto the product or the respective packaging by using a specific printing device 118 having a resolution of 300 dpi, wherein the term "dpi" here refers to pixels per inch, the exemplary barcode 110 exhibits a size of $\frac{2}{5}$ of an inch which equals 10.16 mm. In industrial applications, the size of the barcode 110 is, generally, adapted to be small enough to fit the space being available on the product or the respective packaging and to be as big as the printing device 118 allows, which is usually ½ inch which equals 12.7 mm. Thus, the dimensions of the barcode are, generally, determined by external parameters, such as the space available on the product or the respective packaging or the maximum space which can be printed by the printing device 118, and, thus, are, generally, not congruent with sizes as imposed by an architecture of the barcode 110. In order to be able to cope with this situation, the printer driver, usually, generates modules 112 of different sizes within the same barcode 110.

As schematically illustrated in FIG. 1, for printing a 10×10 mm² barcode 110 of 16×16 modules 112 at 300 dpi, the average number of pixels for a single module 112 can be calculated to be equal to approximately 7.38. However, the printing device 118 as described above may allow printing only an integral number of pixels 120, such as either 7 pixels or 8 pixels. As a consequence, a driver software for driving the printing device 118 may be calculating a width of 7 pixels for at least one first kind of modules 122 and a width of 8 pixels for at least one second kind of modules 124 in order to approach the calculated value of 7.38 as close as possible. As depicted in two enlarged segments of FIG. 1, the driver software may propose to print 10 first kinds of modules 122 having a width of 7 pixels and 6 second kinds of modules 124 having a width of 8 pixels within a column 126 of the barcode 110. This method is, generally, used for generating standard barcodes, such as the Data Matrix barcode. In this regard, the driver software may be configured to decide about a repartition in which the first kinds of modules 122 having a width of 7 pixels (which also denoted by the term "small modules") and the second kinds of modules 124 having a width of 8 pixels (which also denoted by the term "large modules") are distributed over the area of the barcode 110, in particular within a column 126 or a row 128 of the barcode 110.

In accordance with the present disclosure, a modified barcode 130 is printed in a resolution which does not allow assigning an identical number of pixels 120 to every module 112. Herein, the first kinds of modules 122 and the second kinds of modules 124, wherein a different number of pixels 120 is assigned to each kind of the modules 122, 124, are distributed over the area of the barcode 110 in a fashion which does neither follow a standard pattern nor a random pattern. Rather, an authentication feature 132 is introduced into the barcode 110 by using a predefined printing modification, which is, particularly achieved by applying the driver software for the printing device 118 accordingly. Herein, the repartition of the two kinds of modules 122, 124 within the area of the barcode 110 is defined by an individual security rationale. As defined above, the term "individual security rationale" refers to instructions for modifying the barcode by introducing at least one additional specific attribute into the printed barcode. In the particular embodiment as illustrated in FIG. 1, the additional specific attribute refers to the repartition of the two kinds of modules 122, 124 within the area of the barcode 110 as defined by the individual security rationale. Using the individual security rationale may, thus, allow modifying the barcode 110 in order to generate the modified barcode 130. Subsequently, the modified barcode 120 printed onto the product or the respective packaging by using the printing device 118.

Figure 2:
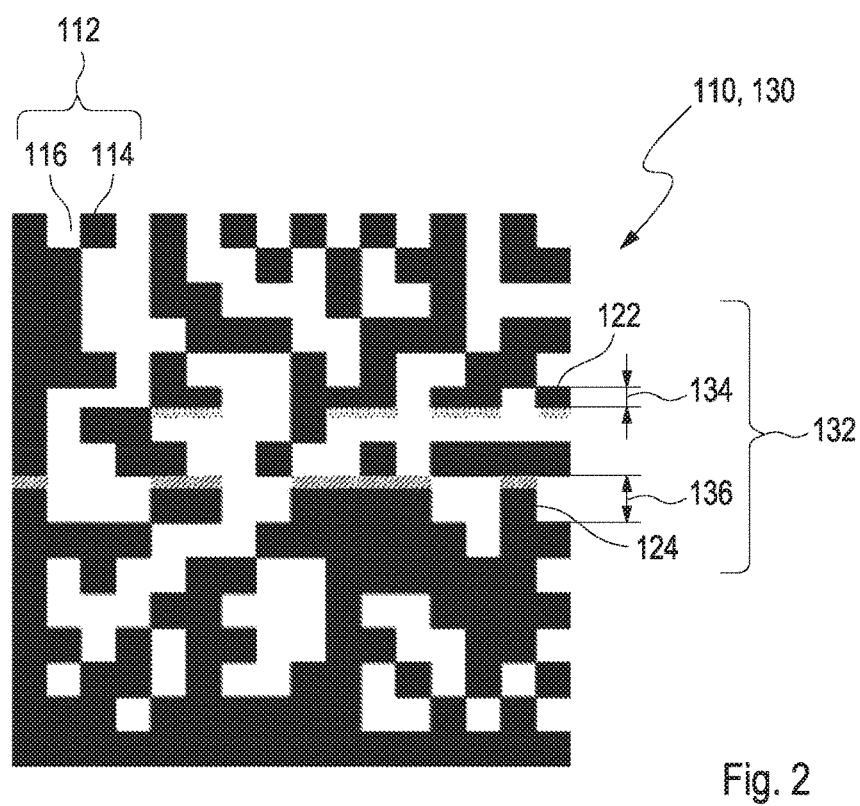
FIG. 2 illustrates barcode modules that exhibit a different height.

Herein, the individual security rationale may cover position information for each entire column 126 as schematically depicted in FIG. 1. Alternatively, the individual security rationale may cover position information for the entire row 128 or for each individually selected module 112 within the barcode. As a first result, as illustrated in FIG. 2, the two kinds of modules 122, 124 exhibit different heights 134, 136. Thus, the different heights 134, 136 of the two kinds of modules 122, 124 may equally be used for the individual security rationale. Irrespective which particular additional specific attribute is used as the individual security rationale, a particularly preferred individual security rationale may be selected to maintain a readability of the modified barcode 130 in a fashion that, by using a machine, the same barcode content may be decoded from the modified barcode 130 and the unmodified barcode 110.

As a further result, re-engineering of such a kind of modification within the modified barcode 130 may be difficult for a counterfeiter since a precision of the printing device 118 is, usually, within the same magnitude as a dimension difference between the two kinds of modules 122, 124. For checking the authenticity of the barcode 110, an image of the barcode 110, preferably taken by a camera, is analyzed by using image analysis methods in order to identify the widths of the modules 112 for identifying the location of the two kinds of modules 122, 124, respectively. Subsequently, the result of the analysis is compared with the data in a central database. If the modified barcode 130 is the original barcode 110, the areal distribution of the two kinds of modules 122, 124 is identical, if not, the modified barcode 130 is counterfeited.

Figure 3:
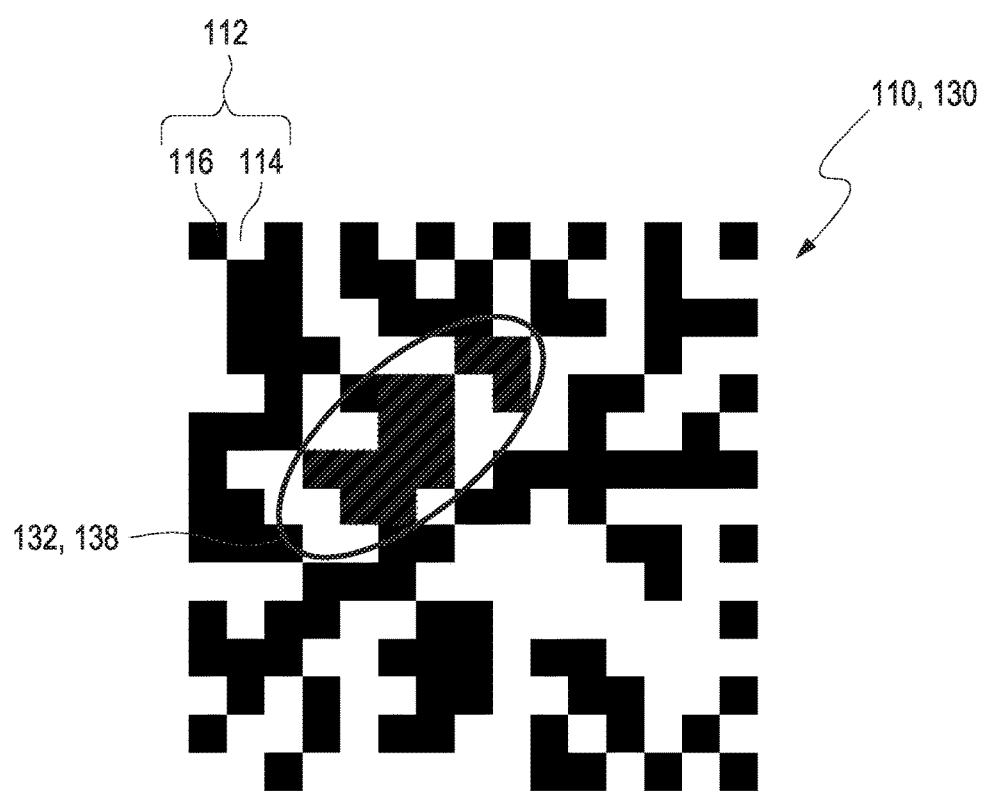
FIG. 3 illustrates padding code words in a barcode.

FIG. 3 illustrates a further embodiment for introducing the authentication feature 132 into the barcode 110, whereby the modified barcode 130 is generated. As described above, the two-dimensional barcode 110 comprises a data storing capacity which, mainly, depends on the number of modules 112, i.e. black squares 114 and the white squares 116, within the barcode 110. By way of example, the standard for a Data Matrix barcode may define the number of modules 112 to be a multiple of even numbers only, e.g. 22×22 modules 112 or 24×24 modules 112. However, the volume of data that may be encoded in the barcode 110 may vary considerably. As a result, a specific barcode content may not use the full capacity of a given barcode 110. As exemplary illustrated in FIG. 3, empty code words or padding code words may be created by using the individual security rationale for generating the modified barcode 130. The individual security rationale related to filling the padding code words into a region 138 of the barcode 110 may allow, thus, generating the modified barcode 130 by using a specific algorithm for calculating an individual padding code word content.

Similarly (not depicted here), the barcode serial number may be extended with an additional number comprising the individual security rationale for generating the modified barcode 130, wherein the additional number may be placed at the end of the serial number. Alternatively, one or more application identifiers which may already be reserved within the barcode 110 may be allocated by using the individual security rationale, in particular, one or more of the application identifiers 90 to 99 according to the GS1 standard specification. The individual security rationale being related to filling the application identifiers of the barcode 110 may allow, thus, generating the modified barcode 130 by using a specific algorithm for allocating the selected application identifiers. However, other kinds of extensions of the barcode may be feasible.

Figure 4:
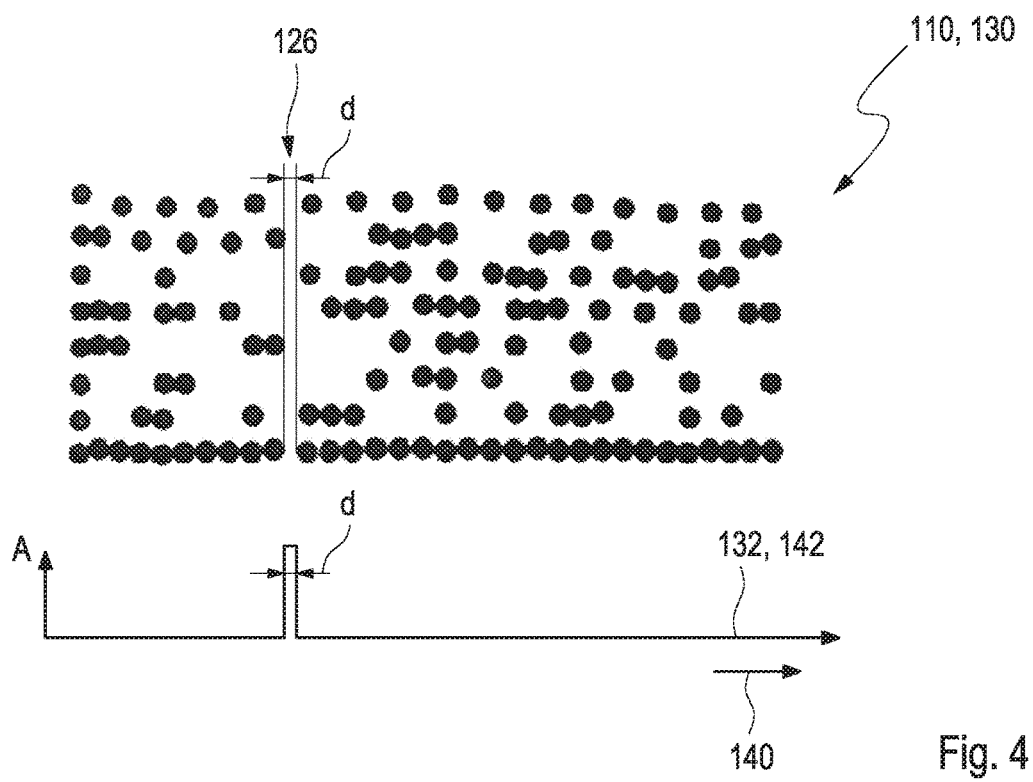
FIG. 4 illustrates a rectangular modification of a dot distance of a continuous inkjet code.

FIG. 4 illustrates a further embodiment for introducing the authentication feature 132 into the barcode 110, whereby the modified barcode 130 is generated. For high-speed printing, continuous inkjet technology is often used. In particular for high-speed printing, continuous inkjet technology may often be used, wherein this technology may, however, be quite precise in a direction of the substrate movement while it may be quite imprecise in an orthogonal direction with respect to the substrate movement. Therefore, the modified barcode 130 may, preferably, be implemented along the direction of movement axis, which may also be denominated as a printing direction 140. Herein, the modification can be an overlay of a first modulation function 142 that may be used for modifying a shaft encoder signal of the printing device 118 in the printing direction 140. In particular, the first modulation function 142 may can be an overlay of an external signal, such as a sinus-wave type, a rectangular type, triangle form, or a mixture of these types, to the shaft encoder signal. In the exemplary embodiment as schematically depicted in FIG. 4, an amplitude A of the first modulation function 142 in printing direction 140 is schematically depicted. Thus, a distance d between two adjacent barcode columns 126 and/or two adjacent barcode rows 128 may accordingly be modified, whereby the modified barcode 130 may be generated, as exemplary illustrated in FIG. 4.

Figure 5:
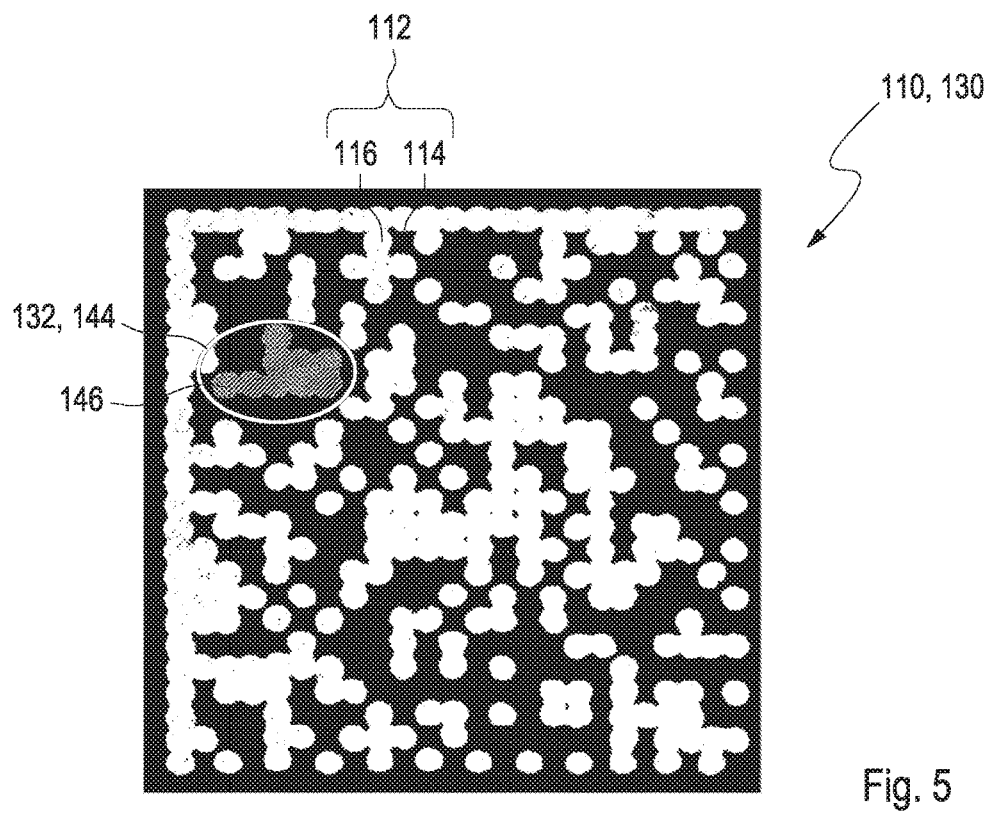
FIG. 5 illustrates a modification of gray values of a laser-printed barcode.

FIG. 5 illustrates a further embodiment for introducing the authentication feature 132 into the barcode 110, whereby the modified barcode 130 is generated. Herein, a power of the printing device 118 may be modified for printing the modified module 130, in particular in at least one selected sector 144 of the barcode 110. Herein, modifying the power of the printing device 118 may result in at least one modified module 146 comprising a lower color density or a higher color density and/or a lower color dot diameter or a higher color dot diameter. In the exemplary embodiment as schematically depicted in FIG. 5, the selected sector 144 refers to a group of modified modules 146 within the modified barcode 130, where, by increasing the power of the printing device 118, the modified modules 112 comprise a higher color density and, concurrently, an increased dot diameter. Thus, a location of the selected sector 144 and the manner of generating the modified modules 146 in the selected sector 144 may be used as the individual security rationale for generating the modified barcode 130.

In an alternative embodiment (not depicted here), by reducing the power of the printing device 118 the differently modified modules 146 might comprise a lower color density and, concurrently, a decreased dot diameter. Again, the location of the selected sector 144 and the different manner of generating the modified modules 146 in the selected sector 144 may be used as the individual security rationale for generating the modified barcode 130.

Figure 6:
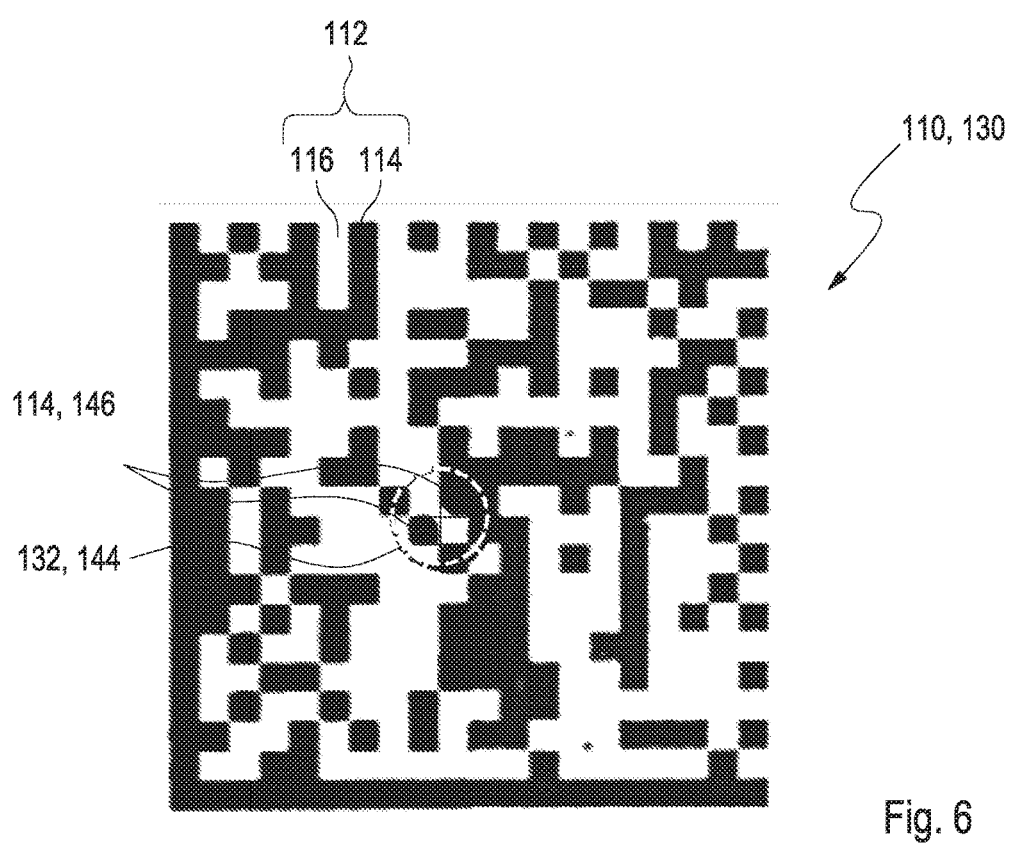
FIG. 6 illustrates removed pixels in corners of adjacent modules.

FIG. 6 illustrates a further embodiment for introducing the authentication feature 132 into the barcode 110, whereby the modified barcode 130 is generated. Herein, the modified barcode 130 may comprise at least one modified module 146 within the selected sector 144 that has been printed by removing at least one defined pixel. In the exemplary embodiment as schematically depicted in FIG. 6, a single defined pixel has been removed in one corners of each of two adjacent black modules 114. However, generating other types of modified modules 146, in particular by removing, in addition or alternatively, one or more pixels one or more black modules 112, such as from two or more adjacent black modules 114, may also be feasible. Herein, the actual manner according to which the modified modules 146 and the pixels missing therein have been selected may be used for determining the specific individual security rationale for generating the modified barcode 130.

Figure 7:
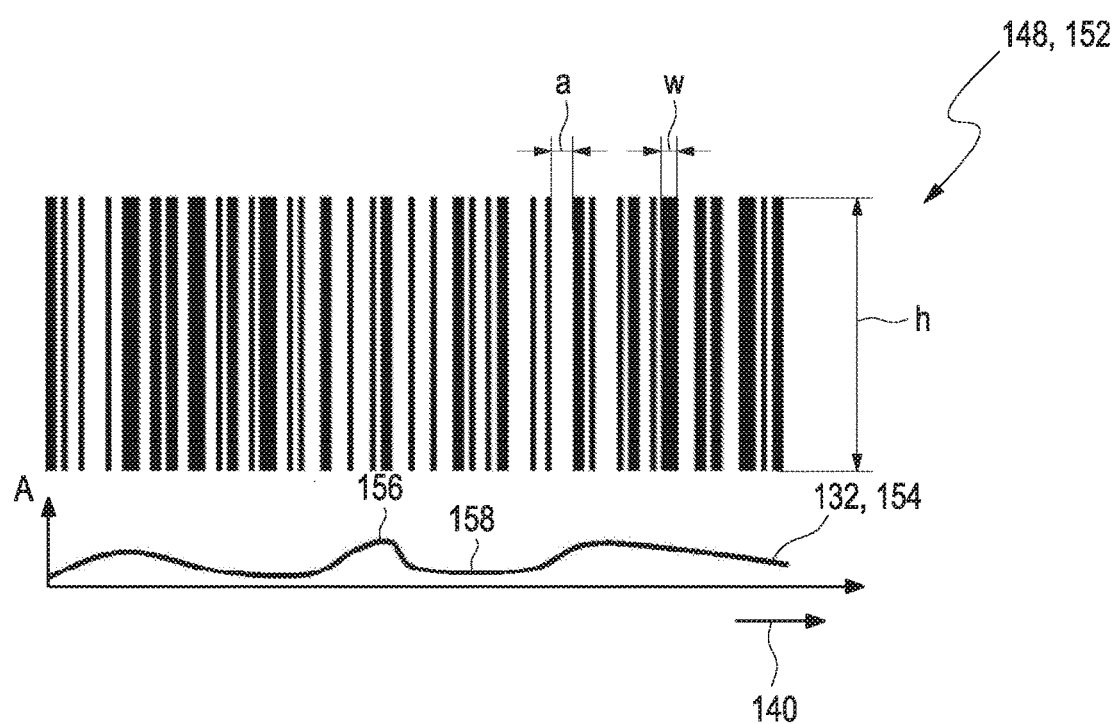
FIG. 7 illustrates modifying the height of a linear barcode.

Further, this type of generating the modified barcode 130 may also be applicable for a linear barcode 148, an embodiment of which is illustrated in FIG. 7. Herein, wherein the modified barcode 130 may be printed by removing at least one defined pixel in at least one designated bar 150. In particular, the at least one defined pixel may be removed in at least one corner of two adjacent bars 150. However, removing other pixels from one or more bars 150 may also be feasible.

FIG. 7 illustrates a further embodiment for introducing the authentication feature 132 into the one-dimensional barcode 148, whereby a modified one-dimensional barcode 152 is generated. In general, the one-dimensional barcode 148, which may also be denominated as a linear barcode, may comprise a plurality of bars 150, wherein each of the bars 150 exhibits a height h, a width w, and a distance a between two adjacent bars 150, wherein the height h of the plurality of the bars 150 within a single one-dimensional barcode 148 is usually selected as being constant whereas the barcode content may be comprised in the width w of the bars 150 and their respective distances. However, other kinds of one-dimensional barcodes 148 may also be feasible.

In the exemplary embodiment as schematically depicted in FIG. 7, the height h of the bars 150 is modified in the printing 140 direction as the authentication feature 132 by applying a second modulation function 154, the amplitude A of which is modified in the printing direction 140. As defined above, the second modulation function 154 may, again, refer to an external signal that comprises the time-varying amplitude A which may, preferably, be selected from a sinus-wave type, a rectangular type, a triangle type, or a mixture of these types. As depicted here, the second modulation function 154 comprises local maxima 156 and/or local minima 158 as expected from a modified sine-wave type. Herein, an actual course of the second modulation function 154, by which the height h of the bars 150 may easily be modified in printing direction 140, or one or more parameters derived from the second modulation function 154 may be used as the individual security rationale for generating the modified one-dimensional barcode 152.

Figure 8:
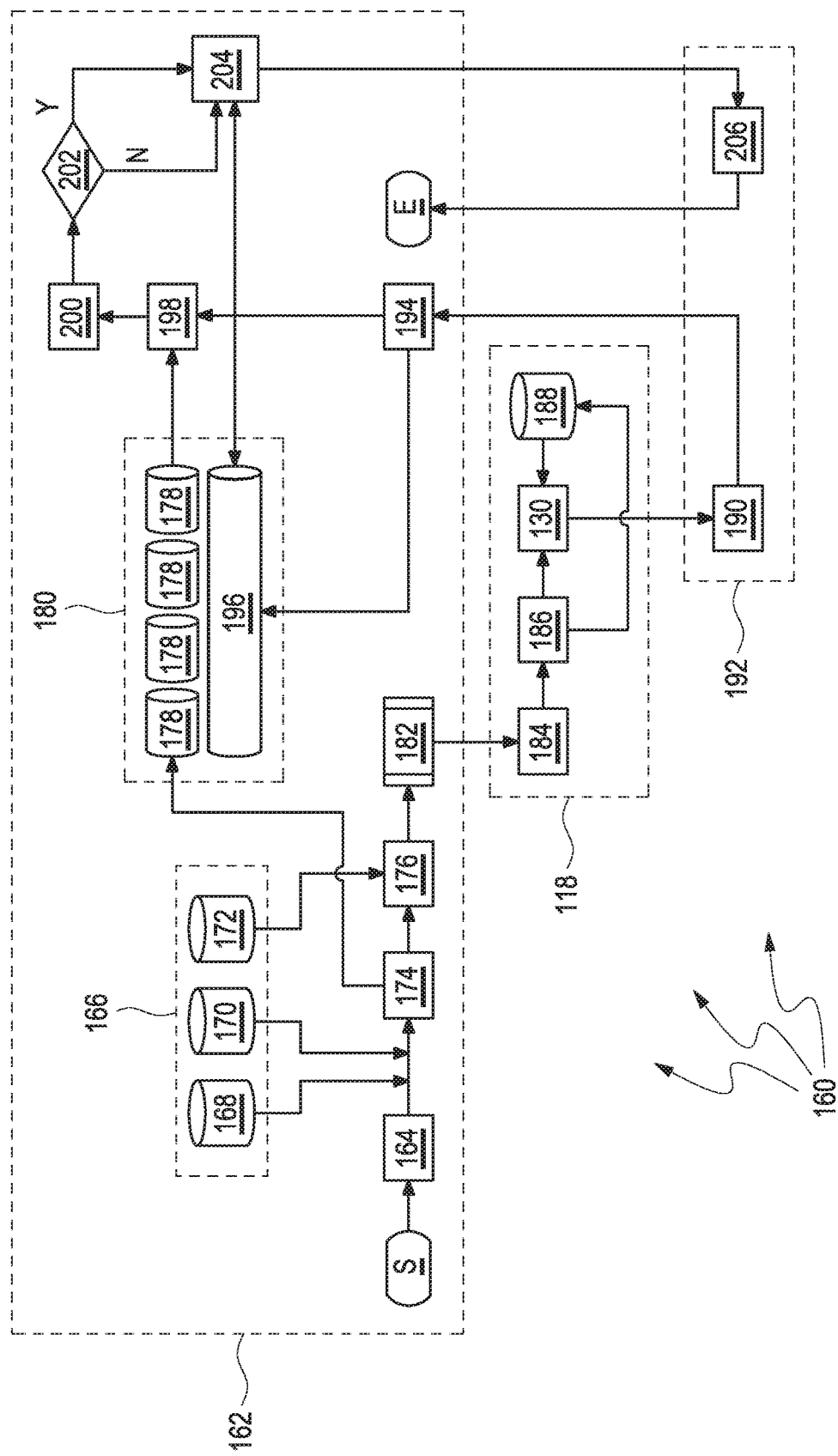
FIG. 8 provides a flowchart illustrating a method for serializing products by using a barcode and the related method for checking the authenticity of the modified barcode used in serializing products.

FIG. 8 presents a flowchart 160 which schematically illustrates both the method for serializing products by using the modified barcode 130 and the related method for checking the authenticity of the modified barcode 130 as used in serializing products.

As generally used, the process as schematically illustrated in the flowchart 160 may comprise a start S. As physically located on a central database 162, such as on a server or in a web-based cloud, initially, a new serialization branch 164 may be opened, thus, allowing a serialization of a given batch of products. Herein, for each customer a separate master data repository 166 may be provided. As used in this particular embodiment, each master data repository 166 may comprise a first database 168, a second data base 170, and a third database 172. Herein, all possible modification options related to the at least one additional specific attribute to be introduced into the barcode 110 may be specified and indexed in the first database 168 while the second data base 170 may comprise a number range repository which may be adapted for managing assigned number ranges in order to ensure that the same serial number may be assigned only once. In addition, the third database 172 may comprise an identifier for the printing device 118 and a corresponding public key database. Preferably based on a random generator, a series of individual security rationales are automatically generated and assigned to a serialization batch 174. For this purpose, data are retrieved from the master data repository 166, wherein the data content for each serialization batch 174 may, in particular, comprise the following items:

a lower border for the number range;
a volume related to the serial numbers;
an individual security rationale identifier;
the identification of the printing device 118; and
a software release number.

Thus, the serialization batch 174 and, subsequently, an encrypted serialization batch 176 may be generated. For this purpose, a usual encryption process may be applied. After generating the encrypted serialization batch 176, the encrypted serialization batch 176 may be transferred to the printing device 118. Further, for each customer a copy 178 of the serialization batch 174 may be transferred to a transaction data repository 180. Herein, the transaction data repository 180 may, particularly, be used for recording transactions that may have been performed in connection with the central database 162, in particular with respect to a transfer 182 of the data. In order to perform the transfer 182 of the encrypted serialization batch 176 to the printing device 118, a protected communication may be provided, e.g. by a virtual private network. However, other kinds of transfer channels preferably allowing protected communication may also be feasible.

Within the printing device 118, the encrypted serialization batch 176 as received by the printing device 118 may be decrypted by using an appropriate decrypter 184, whereby the serialization batch 174 without encryption may be obtained again. For this purpose, a private key of the printing device 118 may be used. Subsequently, a retriever 186 may be used to locally generate from the serialization batch 174 the sequential serial numbers out of the given number range. In addition, the retriever 186 may, further, be used to decode the individual security rationale, wherein the individual security rationale being determined in this manner may, additionally, be stored in a code identifier database 188. For this purpose, the printing device 118 may not only be designed for printing variable data but also comprise a separate data storage in which instructions for generating the modified barcode 130 may be managed. In this regard it may be mentioned that in a case in which the individual security rationale may be updated in the master data repository 166 of the central database 162, the respective data in all printing devices 118 may need to be updated. Subsequently, the sequential serial number and the individual security rationale are used for generating the modified barcode 130. Thus, according to the present invention, the modified barcode 130 is generated for the sequential serial number related to the product and modified by the individual security rationale as specified in the serialization batch 174, wherein the modified barcode 130 is, finally, printed on the respective product by using the printing device 118.

In order to check the authenticity of the barcode which is used in a particular serialized product, a digital imaging device 190, in particular, of a smartphone 192 may be used. However, other kinds of digital devices, in particular a cell phone, a tablet computer, a flatbed scanner, a hand scanner, or a barcode scanner may also be employed for this purpose. Herein, the digital imaging device 190 is used to take at least one image of the modified barcode 130, to process the image in order to be capable of identifying the barcode within the image and, in addition, to submit the image to the central database 162. For identifying the barcode within the image at least one of the sub-steps b1) to b4) as described above may be employed. Further, in order to achieve a quick and efficient analysis of the of the modified barcode 130 by the smartphone 192, the image may be isolated from remaining parts of the picture as taken by the digital imaging device 190, thereby disregarding the remaining parts of the picture. Thereafter, a correct exposition of the image may be verified, a distribution of an illumination over the image may be examined, a contrast of the image may be reviewed, and/or an existence of a blur within the image, in particular a motion blur and/or a focus blur, may be disproved.

As mentioned above, the image is transferred to the central database 162 and received by a decoder 194 which is adapted for reading out a barcode content of the modified barcode 130, whereby the serial number of the product is acquired by analyzing the barcode content with respect to the related barcode specification. In order to be able to check whether the single serial code has been queried before according to step f), the serial number of the product may then be stored in a data repository of queried numbers 196, which may be physically located in the transaction data repository 180. However, another location may also be feasible.

Further, a security identification module 198 may be used for determining the individual security rationale which is assigned to the single serial number as provided by the decoder 194. Herein, by referring to the customer copy 178 of the serialization batch 174, such as located in the transaction data repository 180, the single serial code provided by the decoder 194 may be used to determine the number range of the serial numbers since, as described above, the serialization batch 174 may, preferably, comprise data related to both the lower border for the number range and the volume related to the serial numbers. Since the serialization batch 174 further comprises an individual security rationale identifier, the assigned individual security rationale may, thus, also be identified and, subsequently, analyzed by the security identification module 198. In this regard, analyzing the assigned individual security rationale may comprise determining the at least one additional specific attribute as comprised in the first database 168, which has been introduced into the barcode. For this purpose, an index related to a possible modification option that has been introduced into the barcode 110 may be specified and related to the at least one additional specific attribute as stored in the first database 168. Finally, the at least one security rationale in the modified barcode 130, 152 is analyzed according to step c). Alternatively, the individual security rationale for the single serial code as stored in a central database 162 may, in accordance with step c'), be used to regenerate the modified barcode 110 which had originally been printed onto the corresponding product.

Thereafter, according to step d), the assigned individual security rationale is compared in a comparing step 200 with the individual security rationale for the single serial code as stored in a central database 162. Consequently, the question 202 whether the two individual security rationales are identical, may be answered positively (Y) or negative (N). Alternatively, the regenerated modified barcode 110 which had originally been printed onto the corresponding product may, in accordance with step d'), be compared in the comparing step 200 with the modified barcode 130, 152 as acquired by the digital imaging device 190 and, preferably, further processed in the decoder 194. Herein, the question 202 whether the two modified barcodes are identical, may be answered positively (Y) or negative (N). Thus, a message 204 is generated that, if the two individual security rationales or the two modified barcodes are, respectively, are identical, the barcode under investigation is an original barcode, or, if the two individual security rationales or the two modified barcodes are, respectively, not identical, that the barcode under investigation is not the original barcode. For comparison purposes, at least one tolerance level can be taken into account within which the authenticity of the barcode under investigation may be still assumed. Herein, the tolerance level may depend on the actual embodiment chosen for the actual individual security rationale. Introducing the tolerance level may, thus, allow taking into account inevitable adverse effects on the barcode under investigation, such as deterioration, ageing, or wear, which may particularly affect the barcode located on the surface of the product.

In a particular embodiment, the message 204 may be modified by performing the optional step f), wherein the data repository of queried numbers 196 of the central database 203 may be checked whether the single serial code has been queried before. If applicable and if a number of queries may be above a threshold number, the message 204 may be modified by comprising a warning. For this purpose, it may be checked how many times the same barcode may have been queried before. Herein, a threshold number, in particular a positive natural number, such as 2, 3, 4, 5, 6, or more, may be used, wherein the threshold number may be selected in order to indicate whether a repeated checking of the same serial number may be considered as being indicative of fraud or not. In addition, it may, further be checked hereby how many previous queries have been performed within which time interval, which may be used for similar purposes.

The message 204 generated as described above, may, thereafter, be stored in the data repository of queried numbers 196 within the central database 162 and, concurrently or subsequently, be submitted to a querying party. If applicable and if a number of queries may be above the selected threshold number, the message 204 as provided to the querying party may be modified by comprising a warning. The querying party may be capable of reading the message 204 which may, for this purpose, be displayed on a display 206, such as on a touchscreen, of the smartphone 192. Again, in case another kind of digital devices, in particular a cell phone, a tablet computer, a flatbed scanner, a hand scanner, or a barcode scanner, may have been used for taking the at least one image of the modified barcode 130, the message may, alternatively, be displayed on the corresponding display 206 of the respective kind of digital device.

Finally, the process as schematically illustrated in the flowchart 160 may, as generally used, comprise an end E. However, the process may, completely or partially, be repeated several times for different products, such by starting again at the start S or by checking the authenticity of the barcode of the same particular serialized product by taking a further digital image using the digital imaging device 190, in particular, of the smartphone 192.

Figure 9:
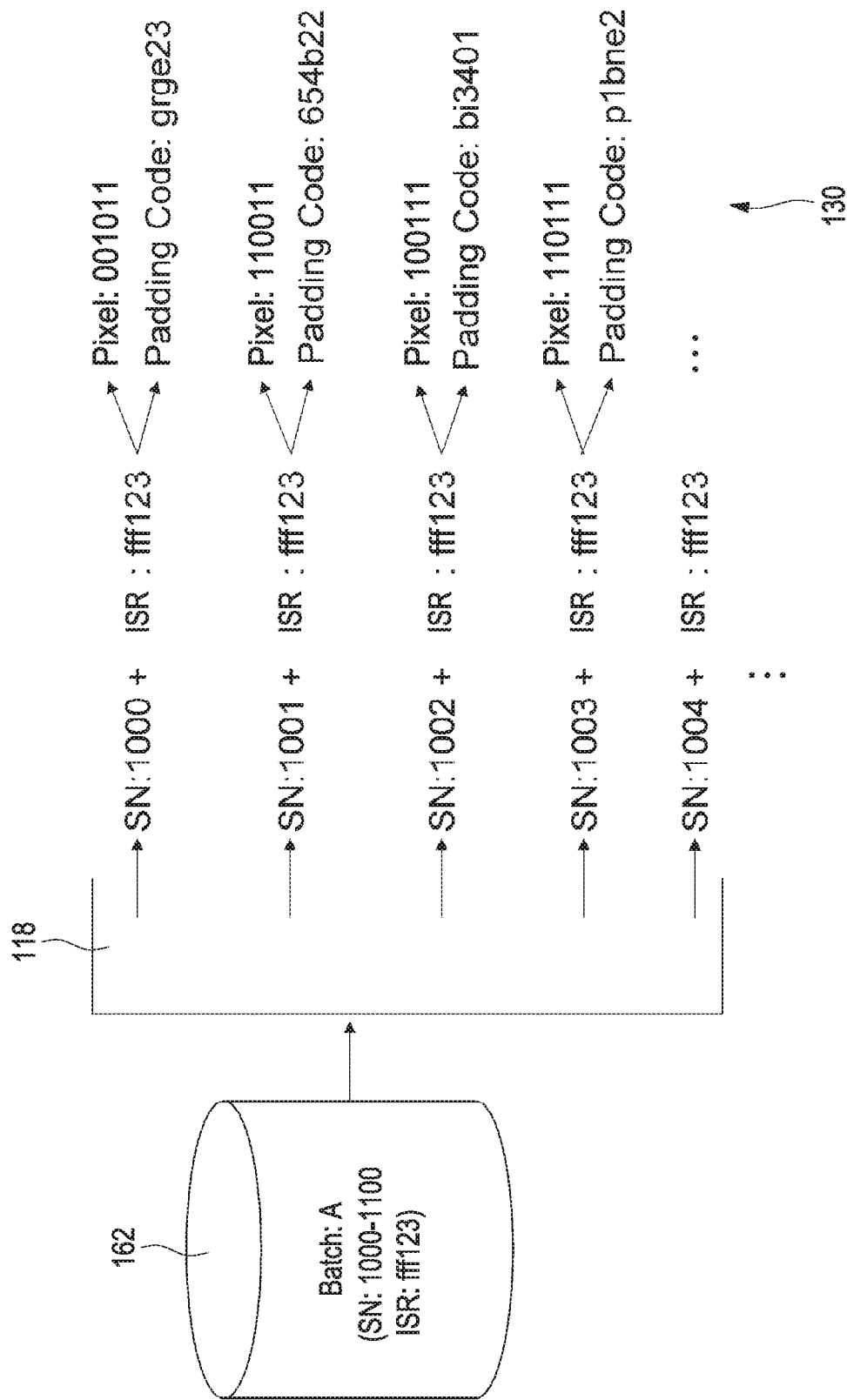
FIG. 9 illustrates an embodiment which demonstrates an operation of a combination of a serial code, and an individual security rationale for generating the modified barcode.

FIG. 9 illustrates an exemplary embodiment which demonstrates an operation of a combination of a serial code and an individual security rationale for generating the modified barcode 130 according to steps i) to iii) of the present disclosure. As schematically depicted there, the central database 162 provides print batch data according to step i) which, on one hand, comprise the serialization batch 174, which is exemplary denoted here by "SN: 1000-1100", thus, indicating that the serial numbers SN for the single serial codes are taken from a contiguous number range from 1000 to 1100, and, on the other hand, the assigned individual security rationale, abbreviated to "ISR", for which the exemplary hexadecimal number "fff123" is selected.

Subsequently, the print batch data are, according to step ii), transmitted to the printing device 118 which is designed for printing variable data. Herein, the combination of the single serial code and the individual security rationale triggers the instructions which automatically generate and print the modified barcode 130. For this purpose, consecutive single serial numbers, starting with 1000 and continuing with 1001, 1002, 1003, 1004 etc., are, as schematically shown in FIG. 9, successively combined with the hexadecimal number fff123 of the individual security rationale in order to provide the modified barcode 130, which, in this example, may be specified by both a corresponding pixel distribution and a padding code as indicated in FIG. 9. This exemplary embodiment demonstrates that the combination of one of the single serial codes 1000, 1001, 1002, 1003, 1004 etc. and the individual security rationale fff123 triggers a modification of each of the barcodes which is, according to the present disclosure, used for concurrently serializing the product and introducing the authentication feature into the barcode 110 as a pixel distribution and a padding code word.

Figure 10:
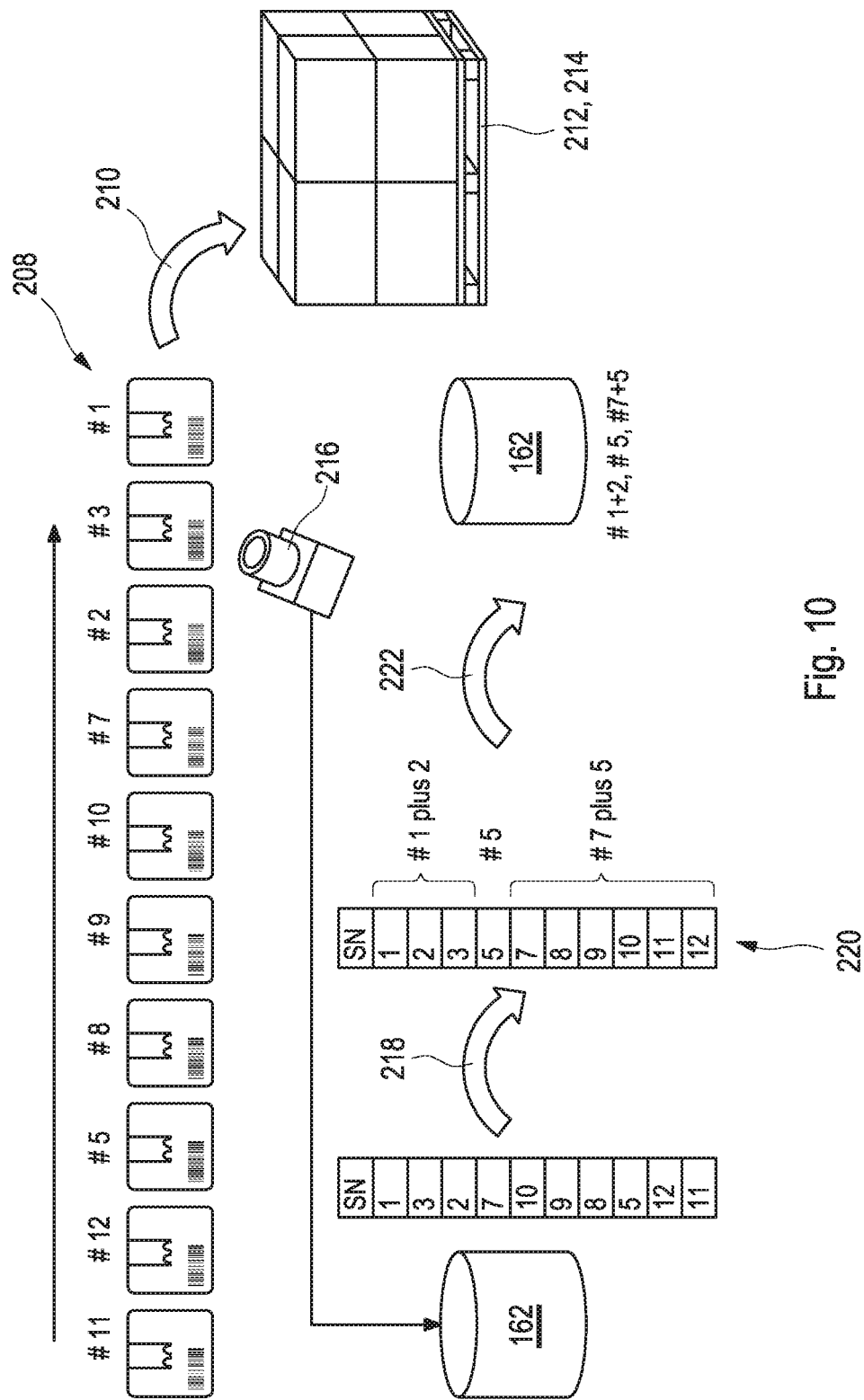
FIG. 10 schematically illustrates an operational scheme for the method for aggregation of sequentially serialized products.

FIG. 10 schematically illustrates an operational scheme for the method for aggregation of sequentially serialized products 208. Herein, the products have, preferably, been serialized by using serial numbers as described above, in particular, according to the exemplary embodiment as depicted in FIG. 9. In FIG. 10, the sequentially serialized products 208 are schematically indicated by the string "#11, #12, #5, #8, #9, #10, #7, #2, #3, #1". Further according to FIG. 10, the sequentially serialized products 208 are subject to an aggregation step 210 by aggregating the products to a common item 212, which is, in this particular embodiment, a number of products arranged on a pallet 214. However, other kinds of common items 212 may also be used, such as a shipping case.

According to step iv) of the aggregation method, the serial numbers of the sequentially serialized products 208 are scanned, such as by employing a scanning device 216 adapted for this purpose, such as by using the digital imaging device 190 as described above. Thereafter, the scanned serial numbers are stored in the central database 162 pursuant to step v). Herein, the stored serial numbers are subject to a sorting step 218 according to step vi), whereby the serial numbers are placed in a sequential order 220. In this exemplary embodiment, the sorting step 218 is performed in an increasing order. However, a decreasing order may also be feasible. The sequential order 220 allows grouping the sorted serial numbers into contiguous number ranges pursuant to method step vii).

As a result, the contiguous number ranges into which the sorted serial numbers have been grouped comprise a single item if no adjacent number may be available; otherwise, if at least one adjacent number may be available, at least two items are grouped within the contiguous number range. Hereby, pursuant to step viii), a root value and a size for each contiguous number range is identified. In the exemplary embodiment according to FIG. 10, the numbers #1, #5 and #7 of the sequential order 220 indicate root values for the corresponding number contiguous number ranges, whereas "plus 2" or "plus 5" are values which are related to the sizes of the corresponding contiguous number ranges, i.e. an additional number of products apart from a single product. However, other kinds of root values or size-related values may also be possible.

Finally, for each contiguous number range, the root value and the size-related value of each contiguous number range are stored in the central database 162 in a storing step 222 according to step ix) of the aggregation method. As a result, this method which may, especially, be applicable to the sequentially serialized products 208 serialized by the serializing method according to the present invention, allows saving a considerable volume of storage space for storing the serial numbers of the aggregated products. This can be derived from the string "#1+2, #5, #7+5" as shown below the central database 162 (version on the right side) which exhibits the same information as the string "#11, #12, #5, #8, #9, #10, #7, #2, #3, #1" as shown above the sequentially serialized products 208.

List of Reference Numbers 110 barcode
112 module
114 black square
116 white square
118 printing device
120 pixel
122 first kind of modules
124 second kind of modules
126 column
128 row
130 modified barcode
132 authentication feature
134 first height
136 second height
138 region
140 direction
142 first modulation function
144 selected sector
146 modified module
148 one-dimensional barcode
150 bar
152 modified one-dimensional barcode
154 second modulation function
156 local maximum
158 local minimum
160 flowchart
162 central database
164 serialization branch
166 master data repository
168 first database -continued List of Reference Numbers

| | |
|---|---|
| 170 | second database |
| 172 | third database |
| 174 | serialization batch |
| 176 | encrypted serialization batch |
| 178 | copy of serialization batch |
| 180 | transaction data repository |
| 182 | transfer of data |
| 184 | decrypter |
| 186 | retriever |
| 188 | code identifier database |
| 190 | digital imaging device |
| 192 | smartphone |
| 194 | decoder |
| 196 | data repository of queried numbers |
| 198 | security identification module |
| 200 | comparing step |
| 202 | question |
| 204 | message |
| 206 | display |
| 208 | sequentially serialized products |
| 210 | aggregation step |
| 212 | common item |
| 214 | Pallet |
| 216 | scanning device |
| 218 | sorting step |
| 220 | sequential order |
| 222 | storing step |

While this invention has been described as having an exemplary design, the present invention may be further modified within the spirit and scope of this disclosure. This application is therefore intended to cover any variations, uses, or adaptations of the invention using its general principles.

What is claimed is:

1. A method for serializing products using a barcode, wherein an authentication feature is introduced into the barcode by a printing modification, the method comprising the following steps:
   providing print batch data using a central database, wherein the print batch data comprise a batch of serial codes and at least one individual security rationale comprising instructions for modifying the barcode, whereby the security rationale is assigned to the barcode and a range of sequential serial numbers is defined;
   transmitting the print batch data to a printing device, wherein the printing device is adapted for printing variable data;
   printing a modified barcode by using a single serial code out of the range of the sequential serial numbers and the assigned individual security rationale as provided by the print batch data, whereby an authentication feature is introduced into the barcode as a function of both the at least one individual security rationale and the single serial code to generate the modified bar code, wherein the modified barcode is printed in a resolution which does not allow assigning an identical number of pixels to every module, wherein the modified barcode is printed by using at least two different kinds of modules, wherein a different number of pixels is assigned to each kind of module, wherein a repartition of the different kinds of modules is defined by a combination of the individual security rationale and the single serial code, wherein the combination of the individual security rationale and the single serial code defines position information for one or more of: at least one individually selected module, at least one entire column of modules, at least one entire row of modules.

2. The method of claim 1, wherein the barcode is a one-dimensional barcode or a two-dimensional barcode, wherein the barcode is generated by using a standard specification.

3. The method of claim 1, wherein the modified barcode is printed by using at least one padding code word.

4. The method of claim 3, wherein the combination of the individual security rationale and the single serial code is adapted to alter the padding code word.

5. The method of claim 1, wherein a barcode serial number is extended with an additional number, wherein the combination of the individual security rationale and the single serial code is adapted to generate the additional number.

6. The method of claim 5, wherein the additional number is placed at the end of the barcode serial number or wherein at least one additional application identifier of the barcode is allocated with the additional number.

7. The method of claim 1, wherein the modified barcode is printed by removing at least one defined pixel in at least one modified module, wherein the combination of the individual security rationale and the single serial code is adapted to define the at least one pixel.

8. The method of claim 7, wherein the at least one defined pixel is removed in at least one corner of two adjacent modified modules.

9. The method of claim 1, wherein the modified barcode is printed by using the at least one modified module, wherein a power of the printing device is modified for printing the modified module, wherein the combination of the individual security rationale and the single serial code is adapted to modify the power of the printing device.

10. The method of claim 9, wherein the modified module comprises at least one of: a lower color density, a higher color density, a lower color dot diameter, higher color dot diameter.

11. The method of claim 1, wherein the modified barcode is printed by matching a distance between two adjacent modules in a printing direction by overlaying a shaft encoder signal, wherein the combination of the individual security rationale and the single serial code is adapted to correspond to the distance.

12. The method of claim 11, wherein the shaft encoder signal is modified in the printing direction by using a first modulation function.

13. The method of claim 1, wherein the barcode is a one-dimensional barcode and comprises a plurality of bars having a height, a width, and a distance between the bars wherein the modified one-dimensional barcode is printed by modifying at least one of the height, the width, and the distance in printing direction.

14. The method of claim 13, wherein at least one of the height, the width, and the distance is modified by using the combination of the individual security rationale and the single serial code to provide a second modulation function.

15. The method according of claim 1, wherein the print batch data are retrieved from a master data repository.

16. The method of claim 15, wherein sequential numbers are used, and wherein an array of serial numbers is issued for each print batch.

17. The method of claim 1, wherein the individual security rationale is selected to maintain a readability of the barcode as determined by at least one quality grade defined in a barcode standard specification.

18. The method of claim 1, wherein the individual security rationale is generated automatically by using a random generator.

19. The method of claim 1, wherein the printing device comprises one or more of: a continuous inkjet printer, a cartridge inkjet printer, a drop-on-demand printer, a digital printer, or a laser printer.

20. The method of claim 19, wherein, in the event that the cartridge inkjet or the drop-on-demand printer nozzle clogs, white stripes caused by the clogged nozzle are identified by a vision system.

* * * * *